(12) United States Patent
Uemura et al.

(10) Patent No.: US 9,558,134 B2
(45) Date of Patent: Jan. 31, 2017

(54) IN-VEHICLE SENSOR, IN-VEHICLE SENSOR SYSTEM, AND METHOD OF SETTING IDENTIFIERS OF IN-VEHICLE SENSORS IN IN-VEHICLE SENSOR SYSTEM

(71) Applicant: NGK SPARK PLUG CO., LTD., Nagoya-shi, Aichi (JP)

(72) Inventors: Tomonori Uemura, Komaki (JP); Chihiro Tomimatsu, Gifu (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 247 days.

(21) Appl. No.: 14/548,587

(22) Filed: Nov. 20, 2014

(65) Prior Publication Data
US 2015/0149682 A1 May 28, 2015

(30) Foreign Application Priority Data

Nov. 21, 2013 (JP) ................................ 2013-240790
Nov. 3, 2014 (JP) ................................ 2014-223859

(51) Int. Cl.
*G06F 13/28* (2006.01)
*H04L 12/40* (2006.01)

(52) U.S. Cl.
CPC ......... *G06F 13/28* (2013.01); *H04L 12/40006* (2013.01); *H04L 2012/40267* (2013.01); *H04L 2012/40273* (2013.01)

(58) Field of Classification Search
CPC .............................................. H04L 12/40006
See application file for complete search history.

(56) References Cited

U.S. PATENT DOCUMENTS

| | | | | |
|---|---|---|---|---|
| 6,684,152 B2 * | 1/2004 | Baeuerle | ............... | B60T 17/221 701/114 |
| 7,523,239 B2 * | 4/2009 | Shimizu | ............ | H04L 12/40169 710/110 |
| 7,668,991 B2 * | 2/2010 | Kopplin | ................ | H04L 12/403 710/104 |
| 8,332,104 B2 * | 12/2012 | Greer | ...................... | G06F 11/30 180/167 |

(Continued)

FOREIGN PATENT DOCUMENTS

JP 2007-024566 A 2/2007
JP 2007-309905 A 11/2007

*Primary Examiner* — Brian Misiura
(74) *Attorney, Agent, or Firm* — Sughrue Mion, PLLC

(57) ABSTRACT

An in-vehicle sensor (1) connected to a communication bus CAN includes a bus connection connector (40) including external communication terminals T3, T4, and external setting terminals T5, T6 each of which is brought into one of a plurality of connection states; judgment means S1-S7 for judging the connection states of the external terminals for setting T5, T6 when electric power is supplied in a state in which the bus connection connector (40) is connected to the communication bus CAN; identifier generation means S8 for generating an identifier ID of the in-vehicle sensor (1) based on the judged connection states; a nonvolatile storage section (11) for storing the identifier ID; communication means (10) for performing communications through the communication bus CAN using the stored identifier ID; and storing means S9 for storing a first generated initial identifier IDS in the storage section (11) as the identifier ID.

8 Claims, 8 Drawing Sheets

(56) References Cited

U.S. PATENT DOCUMENTS

| | | | | |
|---|---|---|---|---|
| 8,532,869 B2 * | 9/2013 | Kimoto | ............. | G01K 15/00 |
| | | | | 701/29.2 |
| 8,961,761 B2 * | 2/2015 | Maeda | ............. | F01N 11/007 |
| | | | | 204/406 |
| 8,996,256 B2 * | 3/2015 | Inamoto | ............. | B60R 21/0173 |
| | | | | 370/245 |
| 9,082,242 B2 * | 7/2015 | Cicala | ............. | G01R 31/007 |
| 9,371,051 B2 * | 6/2016 | Shimizu | ............. | B60R 21/0136 |
| 2005/0154474 A1 * | 7/2005 | Kauntz | ............. | B60R 16/0315 |
| | | | | 700/1 |
| 2014/0344499 A1 * | 11/2014 | Uemura | ............. | G06F 13/4086 |
| | | | | 710/313 |
| 2015/0046133 A1 * | 2/2015 | Morita | ............. | G06F 17/5009 |
| | | | | 703/2 |
| 2015/0308998 A1 * | 10/2015 | Suzuki | ............. | B60L 11/1881 |
| | | | | 73/31.05 |

* cited by examiner

IN-VEHICLE SENSOR, IN-VEHICLE SENSOR SYSTEM, AND METHOD OF SETTING IDENTIFIERS OF IN-VEHICLE SENSORS IN IN-VEHICLE SENSOR SYSTEM

TECHNICAL FIELD

The present invention relates to an in-vehicle sensor which is to be mounted in plural in a vehicle and to be connected to a communication bus constructed in the vehicle, to an in-vehicle sensor system in which a plurality of in-vehicle sensors are connected to such a communication bus, and to a method of setting identifiers of a plurality of in-vehicle sensors in an in-vehicle sensor system.

BACKGROUND ART

Various sensors such as gas sensors (e.g., an oxygen sensor and an NOx sensor), a temperature sensor, and a knock sensor are mounted on a vehicle. Such in-vehicle sensors are connected to a communication bus constructed in the vehicle, and are controlled, in a centralized manner, by an ECU (electronic control unit) connected to the communication bus. Therefore, each in-vehicle sensor has an identifier which is assigned thereto and is used for identifying the sensor in communications through the communication bus. The ECU exchanges communication data with each in-vehicle sensor through the communication bus by designating the identifier.

Notably, examples of standards for such a communication bus include CAN (Controller Area Network) and LIN (Local Interconnect Network).

PRIOR ART DOCUMENTS

Patent Documents

[Patent Document 1] Japanese Patent Application Laid-Open (kokai) No. 2007-24566
[Patent Document 2] Japanese Patent Application Laid-Open (kokai) No. 2007-309905

SUMMARY OF THE INVENTION

Problem to be Solved by the Invention

Therefore, each in-vehicle sensor must be installed at a predetermined location on a vehicle, with an identifier used in communications through the communication bus being assigned thereto in advance. In some cases, a plurality of in-vehicle sensors of the same type are used in a single vehicle. For example, as shown in FIG. 6 of Patent Document 1, in a fuel cell vehicle, a plurality of hydrogen sensors of the same type are mounted as in-vehicle sensors. Notably, the details of such a hydrogen sensor is disclosed in Patent Document 2, which shows a hydrogen sensor (hydrogen gas leakage detector) disposed in piping of a fuel cell unit of an automobile. Therefore, it is necessary to prepare in-vehicle sensors which are of the same type but have different identifiers corresponding to their installation locations. Also, when a plurality of in-vehicle sensors are installed in a vehicle, due to confusion in using the in-vehicle sensors, the in-vehicle sensors may be erroneously installed; i.e., a sensor whose identifier differs from the correct one may be connected. Much labor has been required to manage the in-vehicle sensors so as to prevent such erroneous installation.

The present invention has been accomplished in view of such a problem, and its object is to provide an in-vehicle sensor to which an identifier does not need to be assigned in advance, an in-vehicle sensor system in which a plurality of such in-vehicle sensors are connected to a communication bus, and a method of setting identifiers of a plurality of in-vehicle sensors in an in-vehicle sensor system.

Means for Solving the Problem

Its one mode is an in-vehicle sensor which is used as each of a plurality of in-vehicle sensors mounted in a vehicle and connected to a communication bus constructed in the vehicle, comprising a bus connection connector used for connection to the communication bus and including one or a plurality of communication external terminals to be connected to a communication line of the communication bus through which communication data flow, and one or a plurality of external terminals for setting, outside the in-vehicle sensor, each external terminal for setting being brought into one of two connection states composed of an open state in which the terminal is not connected to any potential and one potential connected state in which the terminal is connected to a predetermined potential, being brought into one of three or more connection states composed of the open state and a plurality of potential connected states in which the terminal is selectively connected to predetermined potentials different from one another, or being brought into one of two or more potential connected states in which the terminal is selectively connected to predetermined potentials different from one another; judgment means for judging the connection state(s) of the one or plurality of external terminals for setting when electric power is supplied to the in-vehicle sensor in a state in which the bus connection connector is connected to the communication bus; identifier generation means for generating an identifier of the in-vehicle sensor on the basis of the connection state(s) of the one or plurality of external terminals for setting judged by the judgment means; a nonvolatile storage section for storing the identifier; communication means for performing communications through the communication bus by using the identifier stored in the storage section; and storing means for storing an initial identifier first generated by the identifier generation means in the storage section as the identifier.

In this in-vehicle sensor, the bus connection connector has one or a plurality of external terminals for setting. Outside the in-vehicle sensor, each terminal for setting (1) is brought into one of two connection states composed of an open state in which the terminal is not connected to any potential and a potential connected state in which the terminal is connected to a predetermined potential, (2) is brought into one of three or more connection states composed of the open state and a plurality of potential connected states in which the terminal is selectively connected to predetermined potentials different from one another, or (3) is brought into one of two or more potential connected states in which the terminal is selectively connected to predetermined potentials different from one another. Namely, the above-described three selection patterns (1) to (3) are provided for selection of the connection state of each external terminal for setting, and each external terminal for setting is brought into one of a plurality of connection states in one of the three selection patterns. Notably, examples of the predetermined potential include a ground potential, a power supply potential, and an intermediate potential such as the middle potential between the ground potential and the power supply potential.

In this in-vehicle sensor, when electric power is supplied in a state in which the bus connection connector is connected to the communication bus, the connection state(s) of the external terminal(s) for setting is judged by the judgment means, and an identifier of the in-vehicle sensor is generated on the basis of the connection state(s). An initial identifier which is an identifier first generated is stored in the non-volatile storage section. After that, the in-vehicle sensor performs communications through the communication bus by using the identifier (initial identifier) stored in the storage section.

Therefore, even in the case where a plurality of in-vehicle sensors of the same type are used in the vehicle, it is unnecessary to assign an identifier to each of the in-vehicle sensors in advance. Also, when each in-vehicle sensor is installed in the vehicle, the external terminal(s) for setting of the bus connection connector is brought into a connection state peculiar to the installed location, whereby the identifier (initial identifier) of the in-vehicle sensor can be made different from those of the remaining in-vehicle sensors.

Further, the above-described in-vehicle sensor preferably comprises identicalness judgment means for judging whether or not a new identifier newly generated by the identifier generation means is identical with the initial identifier; and anomaly transmission means, operable when the new identifier is not identical with the initial identifier, for causing the communication means to transmit communication data indicating a generation anomaly of the new identifier.

This in-vehicle sensor includes identicalness judgment means and anomaly transmission means. In the case where the new identifier newly generated by the identifier generation means is not identical with the initial identifier stored in the storage section, the anomaly transmission means causes the communication means to transmit communication data which indicates a generation anomaly of the new identifier. Therefore, it is possible to notify other devices, such as an ECU, of the fact that the generation anomaly of the new identifier has occurred because the in-vehicle sensor was affected by temporary noise when it judged the connection state(s) of the external terminal(s) for setting, the connection of the external terminal(s) for setting was broken, or the in-vehicle sensor was removed temporarily for maintenance or the like and was then connected to a connector at a location different from the location of the connector to which the in-vehicle sensor had been connected before the removal.

Further, in the above-described in-vehicle sensor, the anomaly transmission means preferably includes anomaly notification data transmission means for causing the communication means to transmit, as the communication data indicating the generation anomaly, communication data which includes the initial identifier and anomaly notification data indicating the generation anomaly.

In this in-vehicle sensor, in the case where the new identifier is not identical with the initial identifier, communication data which includes the initial identifier and anomaly notification data is transmitted. Therefore, an in-vehicle sensor in which a generation anomaly of the new identifier has occurred can be properly reported to other devices such as an ECU.

Further, in the above-described in-vehicle sensor, the anomaly transmission means preferably includes identifier substitution means for causing the communication means to transmit, as the communication data indicating the generation anomaly, communication data which includes a predetermined anomaly identifier.

In this in-vehicle sensor, in the case where the new identifier is not identical with the initial identifier, communication data which includes a predetermined anomaly identifier is transmitted. Therefore, the presence of an in-vehicle sensor in which a generation anomaly of the new identifier has occurred can be properly reported to other devices such as an ECU.

Further, any of the above-described in-vehicle sensors preferably comprises second judgment means for judging the connection state(s) of the one or plurality of external terminals for setting at each of predetermined timings after the in-vehicle sensor has been powered and the connection state(s) has been judged by the judgment means; second identifier generation means for generating a second identifier of the in-vehicle sensor at each of the predetermined timings on the basis of the connection state(s) judged by the second judgment means; second identicalness judgment means for judging whether or not the second identifier generated by the second identifier generation means is identical with the initial identifier; and second anomaly transmission means, operable when the second identifier is not identical with the initial identifier, for causing the communication means to transmit communication data indicating a generation anomaly of the second identifier.

In this in-vehicle sensor, the connection state(s) of the one or plurality of external terminals for setting is judged at each of the predetermined timings after the in-vehicle sensor has been powered, the second identifier at each of the predetermined timings is newly generated, and a judgment is made as to whether or not the generated second identifier is identical with the initial identifier. When the second identifier is not identical with the initial identifier, the communication means is caused to transmit communication data indicating a generation anomaly of the second identifier.

Since anomaly diagnosis is regularly performed after the in-vehicle sensor has been powered as described above, in the case where an anomaly of the second identifier occurs, the occurrence of the anomaly can be immediately reported to other devices such as an ECU.

Notably, the diagnosis using the second identifier at each of the predetermined timings may be performed in addition to the above-described diagnosis which is performed at the time of power on and which uses the new identifier. Alternatively, the diagnosis using the second identifier at each of the predetermined timings may be performed solely without performing the diagnosis which uses the new identifier.

Also, the predetermined timings may be regular timings (e.g., the diagnosis using the second identifier is performed at intervals of 10 minutes) or irregular timings (e.g., the diagnosis using the second identifier is performed each time the vehicle stops ten times).

Another mode is an in-vehicle sensor system comprising a communication bus constructed in the vehicle, and a plurality of in-vehicle sensors according to any one of claims 1 to 4 which are mounted in the vehicle and connected to the communication bus, the in-vehicle sensor system including a plurality of connection paths which connect the in-vehicle sensors to the communication bus and each of which includes a sensor connection connector provided for each of the plurality of in-vehicle sensors and mated with the bus connection connector of the corresponding in-vehicle sensor, wherein each of the plurality of connection paths includes a connection path for communication for connecting the one or plurality of communication external terminals to the communication line of the communication bus, and one or a plurality of setting paths provided for the one or plurality of external terminals for setting so as to set the connection state(s) thereof, wherein the one or plurality of setting paths differ among the connection paths in terms of the combination of the connection state(s) of the external terminal(s) for setting set by the setting path(s), whereby all the in-vehicle sensors are made different from one another in terms of the identifier stored in the storage section.

This in-vehicle sensor system include a plurality of connection paths each of which includes a sensor connection connector provided for each of the plurality of in-vehicle sensors and mated with the bus connection connector of the corresponding in-vehicle sensor. Also, each of the plurality of connection paths includes one or a plurality of setting paths provided for the one or plurality of external terminals for setting so as to set the connection states thereof. The one or plurality of setting paths differ among the connection paths in terms of the combination of the connection state(s) of the external terminal(s) for setting set by the setting path(s). By virtue of this, there can be obtained an in-vehicle sensor system in which prior assignment of identifiers is unnecessary, and a plurality of in-vehicle sensors of the same type can be used by setting the stored identifiers of the in-vehicle sensors such that they differ from one another.

Notably, in the case where the bus connection connector includes a plurality of external terminals for setting, the expression "the combination of the connection state(s) of the external terminal(s) for setting" used herein refers to the combination of the connection states of the plurality of external terminals for setting, and, in the case where the bus connection connector includes a single external terminal for setting, the expression "the combination of the connection state(s) of the external terminal(s) for setting" used herein refers to the connection state of the single external terminal for setting.

Another mode is an identifier setting method for an in-vehicle sensor system comprising a communication bus constructed in the vehicle, and a plurality of in-vehicle sensors mounted in the vehicle and connected to the communication bus, the method setting identifiers for the plurality of in-vehicle sensors, wherein each of the in-vehicle sensors includes a bus connection connector used for connection to the communication bus and including one or a plurality of communication external terminals to be connected to a communication line of the communication bus through which communication data flow, and one or a plurality of external terminals for setting, outside the in-vehicle sensor, each external terminal for setting being brought into one of two connection states composed of an open state in which the terminal is not connected to any potential and one potential connected state in which the terminal is connected to a predetermined potential, being brought into one of three or more connection states composed of the open state and a plurality of potential connected states in which the terminal is selectively connected to predetermined potentials different from one another, or being brought into one of two or more potential connected states in which the terminal is selectively connected to predetermined potentials different from one another, a nonvolatile storage section for storing the identifier, and communication means for performing communications through the communication bus by using the identifier stored in the storage section; the in-vehicle sensor system includes a plurality of connection paths which connect the in-vehicle sensors to the communication bus and each of which includes a sensor connection connector provided for each of the plurality of in-vehicle sensors and mated with the bus connection connector of the corresponding in-vehicle sensor, each of the plurality of connection paths including a connection path for communication for connecting the one or plurality of communication external terminals to the communication line of the communication bus, and one or a plurality of setting paths provided for the one or plurality of external terminals for setting so as to set the connection state(s) thereof, wherein the one or plurality of setting paths differ among the connection paths in terms of the combination of the connection state(s) of the external terminal(s) for setting set by the setting path(s); and the identifier setting method comprises a judgment step of judging the connection state(s) of the one or plurality of external terminals for setting when electric power is supplied to the in-vehicle sensor in a state in which the bus connection connector is connected to the communication bus; an identifier generation step of generating an identifier of the in-vehicle sensor on the basis of the connection state(s) of the one or plurality of external terminals for setting judged by the judgment step; and a storing step of storing an initial identifier first generated by the identifier generation step in the storage section as the identifier, wherein the judgment step, the identifier generation step, and the storing step are performed for each of the plurality of in-vehicle sensors.

In this identifier setting method for setting identifiers of a plurality of in-vehicle sensors in an in-vehicle sensor system, when power is supplied to each in-vehicle sensor in a state in which the bus connection connector is connected to the communication bus, the connection state(s) of the external terminal(s) for setting is judged by the judgment step, and an initial identifier (first generated identifier) of the in-vehicle sensor is generated on the basis of the connection state(s) by the identifier generation step. Subsequently, by the storing step, the generated initial identifier is stored in the nonvolatile storage section as an identifier.

Therefore, different identifiers (initial identifiers) can be set for all the in-vehicle sensors.

Also, the above-described identifier setting method preferably comprises an identicalness judgment step of judging whether or not a new identifier newly generated by the identifier generation step is identical with the initial identifier; and an anomaly transmission step of, when the new identifier is not identical with the initial identifier, causing the communication means to transmit communication data indicating a generation anomaly of the new identifier, wherein the identicalness judgment step and the anomaly transmission step are performed for each of the plurality of in-vehicle sensors.

In this identifier setting method, by the identicalness judgment step, a judgment is made as to whether the new identifier newly generated by the identifier generation step is identical with the initial identifier stored in the nonvolatile storage section. In the case where the new identifier is not identical with the initial identifier, the communication means is caused by the anomaly transmission step to transmit communication data which indicates a generation anomaly of the new identifier. Therefore, it is possible to notify other devices, such as an ECU, of occurrence of the generation anomaly of the new identifier.

BRIEF DESCRIPTION OF THE DRAWINGS

FIG. 3 Flowchart relating to the in-vehicle sensor according to the first through third embodiments and showing operation of the microprocessor at the time of first power on.

FIG. 4 Flowchart relating to the in-vehicle sensor according to the first embodiment and showing operation of the microprocessor at the time of second or subsequent power on.

FIG. 6 Flowchart relating to the in-vehicle sensor according to the second embodiment and showing operation of the microprocessor at the time of second or subsequent power on.

FIG. 7 Flowchart relating to the in-vehicle sensor according to the modified embodiment and showing operation of the microprocessor at the time of first power on.

FIG. 8 Flowchart relating to the in-vehicle sensor according to the third embodiment and showing operation of the microprocessor at the time of second or subsequent power on.

MODES FOR CARRYING OUT THE INVENTION (First Embodiment)

Figure 1:
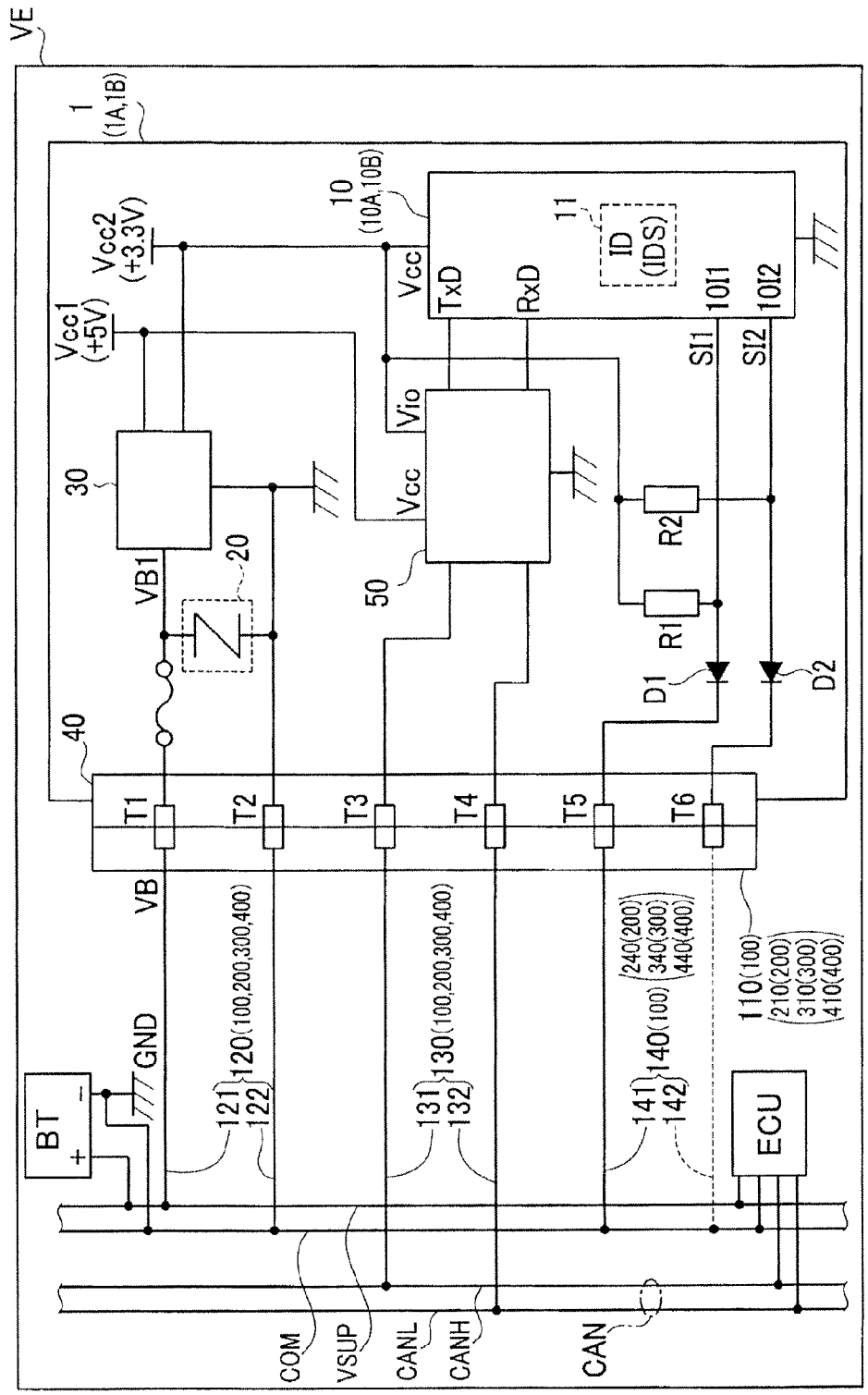
FIG. 1 Explanatory diagram schematically showing the configuration of an in-vehicle sensor according to first through third embodiments and a modified embodiment.
Figure 2:
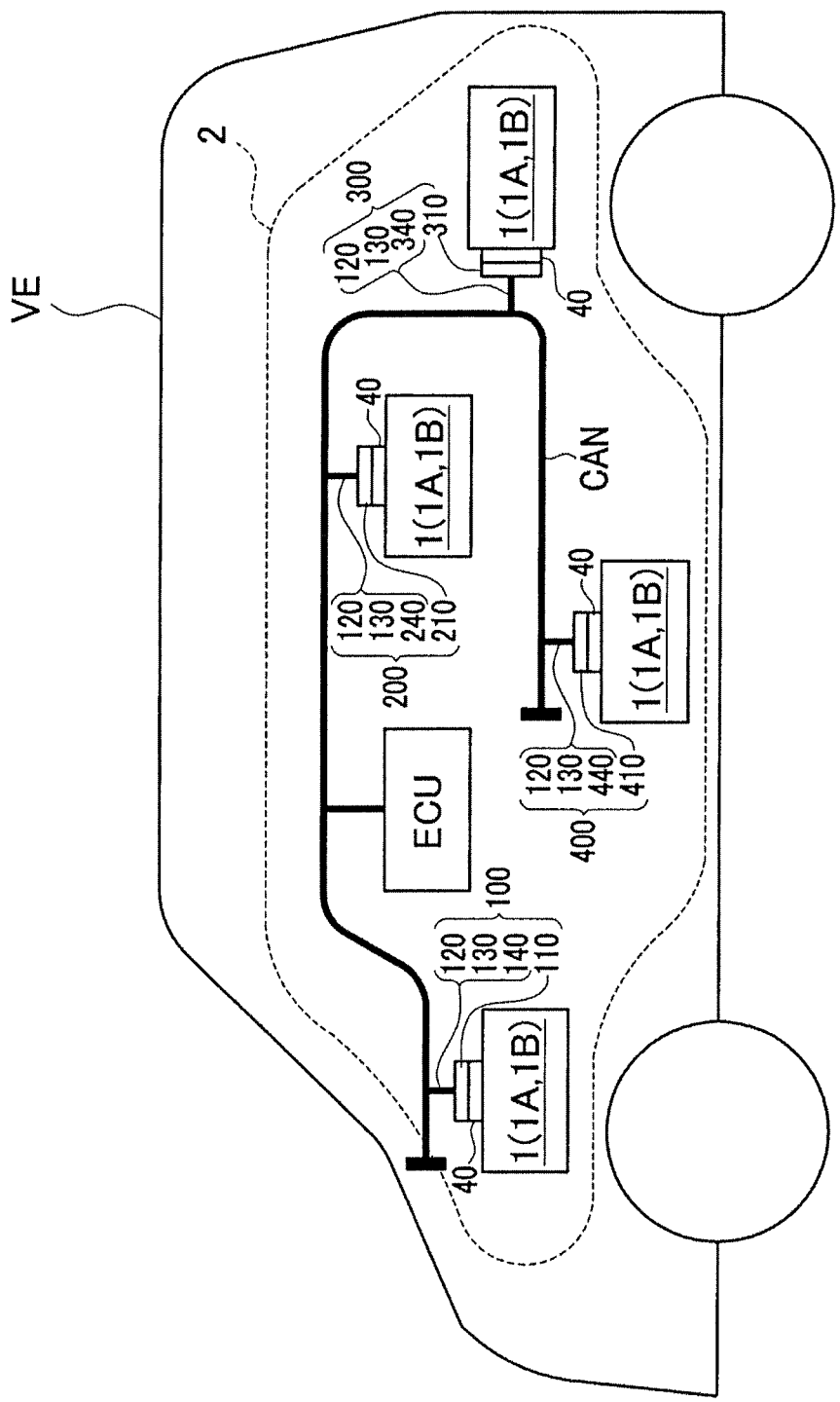
FIG. 2 Schematic diagram of an in-vehicle sensor system in which a plurality of in-vehicle sensors according to the first through third embodiments and the modified embodiment are connected to a communication bus.

A first embodiment of the present invention will now be described with reference to the drawings. FIG. 1 is a diagram schematically showing the configuration of an in-vehicle sensor 1 according to the present first embodiment mounted on a vehicle VE. Also, FIG. 2 is a schematic diagram of an in-vehicle sensor system 2 in which a plurality of in-vehicle sensors 1 are connected to an ECU through a communication bus constructed in the vehicle VE. In this in-vehicle sensor system 2, a CAN bus is used as a communication bus. Notably, the in-vehicle sensor 1 is a hydrogen sensor which is the same as a hydrogen sensor disclosed in Patent Document 1 and to which the present invention is applied. However, in the present first embodiment, description on a sensor portion of the in-vehicle sensor 1 is omitted, and only a portion relating to the connection with the CAN bus which is a communication bus and a portion relating to communications with the ECU will be described.

As shown in FIG. 1, each of a plurality of (four in the present first embodiment) in-vehicle sensors 1, 1 mainly includes a microprocessor 10 having a CAN controller function, a CAN transceiver 50, a surge protection circuit 20, a stabilized power supply circuit 30, and a bus connection connector 40 having six terminals T1-T6. These in-vehicle sensors 1 are connected to the CAN bus and a power line by connection paths 100, 200, 300, 400 including sensor connection connectors 110, 210, 310, 410 mated with corresponding bus connection connectors 40 (see also FIG. 2).

The CAN bus includes two communication lines CANH, CANL through which communication data flow. Notably, communication on the CAN bus is differential serial communication in which a signal is transmitted by a potential difference between the two communication lines CANH and CANL. The power line includes a VSUP line connected to a power supply potential VB supplied from a + terminal of a battery BT (12 V) of the vehicle VE, and a COM line connected to a ground potential GND communicating with a − terminal of the battery BT.

First, the connection paths 100, 200, 300, 400 will be described.

Each connection path 100-400 includes not only the sensor connection connector 110, 210, 310, 410, but also a power supply line 120 composed of lines 121, 122 through which the terminals T1, T2 of the bus connection connector 40 mated with the sensor connection connector 110-410 are connected to the VSUP line and the COM line of the power line, respectively, and a communication connection path 130 composed of lines 131, 132 through which the terminals T3, T4 of the bus connection connector 40 are connected to the communication lines CANH, CANL of the CAN bus.

Further, the connection path 100-400 includes a setting path 140 (lines 141, 142), 240, 340, 440 for determining the connection states of the terminals T5, T6 of the bus connection connector 40 outside the in-vehicle sensor 1.

Notably, in FIG. 1, the line 141 of the setting path 140 indicated by a continuous line is connected to the COM line of the power line. Therefore, the terminal T5 of the bus connection connector 40 connected to the connection path 100 is connected to the ground potential GND outside the in-vehicle sensor 1. Also, a line 142 indicated by a broken line is not present in actuality, and is not connected to the COM line. Therefore, the terminal T6 of the bus connection connector 40 connected to the connection path 100 is brought into an open state in which it is not connected to any potential outside the in-vehicle sensor 1. Namely, the setting path 140 (lines 141, 142) of the connection path 100 is set such that the terminal T5 is connected to the ground potential GND and the terminal T6 becomes an open state.

The connection paths 200, 300, 400 have setting paths 240, 340, 440, respectively, in place of the setting path 140 of the connection path 100. Although not illustrated, the setting path 240 is set such that both the terminals T5, T6 are connected to the ground potential GND. The setting path 340 is set such that the terminal T5 is brought into an open state and the terminal T6 is connected to the ground potential GND. The setting path 440 is set such that each of the terminals T5, T6 is brought into an open state.

As described above, the setting paths 140, 240, 340, 440 differ from one another in terms of the combination of the connection states of the terminals T5, T6. Notably, the sensor connection connectors 110-410 of the connection paths 100-400 have the same specifications except the point that the different setting paths 140-440 are connected to the sensor connection connectors 110-410. Also, the remaining paths other than the setting paths 140-440 and the sensor connection connectors 110-410; i.e., the power supply line 120 and the communication connection path 130, are the same among all the connection paths 100-400.

Next, the internal configuration of the in-vehicle sensor 1 will be described.

As described above, the terminal T1 of the bus connection connector 40 is connected to the VSUP line of the power line through the line 121 of the power supply line 120 of the connection path 100-400. Namely, the terminal T1 is a power supply terminal connected to the power supply potential VB. As described above, the terminal T2 is connected to the COM line of the power line through the line 122 of the power supply line 120 of the connection path 100-400. Namely, the terminal T2 is a ground terminal connected to the ground potential GND.

The power supply potential VB supplied to the terminal T1 is connected to the surge protection circuit 20 which is formed by a varistor, etc. and which absorbs surge voltage superimposed on the power supply potential VB. From the output potential VB1 of the surge protection circuit 20, stabilized control power supply voltages Vcc1 (=+5 V), Vcc2 (=+3.3 V) used in the in-vehicle sensor 1 are generated by a stabilized power supply circuit 30. Notably, a Vcc terminal of the microprocessor 10 is connected to the control power supply voltage Vcc2 (=+3.3 V), and the microprocessor 10 is driven by the control power supply voltage Vcc2. The CAN transceiver 50 is driven by two power supplies; i.e., the control power supply voltage Vcc1 (=+5 V) supplied to a Vcc terminal thereof and the control power supply voltage Vcc2 (=+3.3 V) supplied to a Vio terminal thereof.

The terminals T3, T4 of the bus connection connector 40 are communication external terminals which are connected to the communication lines CANH, CANL of the CAN bus, externally of the in-vehicle sensor 1, through the communication connection path 130 (the lines 131, 132) of the connection path 100-400. Within the in-vehicle sensor 1, the terminals T3, T4 are connected to the CAN transceiver 50. The CAN transceiver 50 is connected to serial communication ports TxD, RxD of the microprocessor 10 which is a CAN controller. The in-vehicle sensor 1 exchanges communication data with the ECU through the communication connection path 130 connected to the terminals T3, T4 of the bus connection connector 40 and the communication lines CANH, CANL. Notably, the ECU designates each piece of equipment connected to the CAN bus by its identifier (hereinafter referred to as the "distinguishing ID") and communicates therewith. Therefore, it is necessary to assign to each in-vehicle sensor 1 a distinguishing ID which does not duplicate with those of other in-vehicle sensor 1 on the CAN bus.

The terminals T5, T6 of the bus connection connector 40 are external terminals for setting each of which is brought into one of two connections states; i.e., an open state (first connection state) in which it is not connected to any potential outside the in-vehicle sensor 1 and a ground potential connected state (second connection state (potential connected state) in which it is connected to the ground potential GND (predetermined potential) outside the in-vehicle sensor 1, by the setting path 140-440 of the connection path 100-400. Notably, as described above, in FIG. 1, the terminal T5 is connected to the ground potential GND (the ground potential connected state) and the terminal T6 is brought into an open state by the setting path 140 (the line 141 indicated by a continuous line and the un-existing line 142 indicated by a broken line) of the connection path 100.

These two terminals T5, T6 are connected to the cathodes of diodes D1, D2 for protection against surge noise or the like, and the anodes of these diodes D1, D2 are connected to the control power supply Vcc2 (=+3.3 V) through resistors R1, R2, respectively. Namely, the terminals T5, T6 are connected to the control power supply Vcc2 through the protection diodes D1, D2 and the resistors R1, R2, respectively. The anodes of the diodes D1, D2 connected to the control power supply Vcc2 through resistors R1, R2 are connected to input ports 10I1, 10I2 which are digital input signal ports (I/O input ports) of the microprocessor 10.

Therefore, in the case where the terminal T5 (T6) is in an open state, the voltage level of the input signal SI1 (SI2) input to the input port 10I1 (10I2) is always equal to the control power supply voltage Vcc2 (=+3.3 V), and the microprocessor 10 recognizes this as a high level. Meanwhile, in the case where the terminal T5 (T6) is connected to the ground potential GND (the ground potential connected state), the input level of the input port 10I1 (10I2) is always about 0.7 V, which is higher than the ground potential GND by an amount corresponding to the forward voltage of the diodes D1, D2, and the microprocessor 10 recognizes this as a low level.

The microprocessor 10 makes a judgment as to whether the connection state of the terminal T5 (T6) is the open state or the ground potential connected state (in which the terminal T5 (T6) is connected to the ground potential GND) on the basis of the input level of the input port 10I1 (10I2) when electric power is supplied to the in-vehicle sensor 1 in a state in which the bus connection connector 40 is connected to the CAN bus (communication bus). Specifically, for example, in the case where the input level of the input port 10I1 is the high level, the microprocessor 10 judges that the terminal T5, to which the input port 10I1 is connected, is in an open state, and, in the case where the input level of the input port 10I1 is the low level, the microprocessor 10 judges that the terminal T5, to which the input port 10I1 is connected, is connected to the ground potential GND (the ground potential connected state) (judgment means). The microprocessor 10 makes the same judgment for the terminal T6 communicating with the input port 10I2.

In FIG. 1, since the input level of the input port 10I1 becomes the low level, the microprocessor 10 judges that the terminal T5 is connected to the ground potential GND (the ground potential connected state). Further, since the input level of the input port 10I2 becomes the high level, the microprocessor 10 judges that the terminal T6 is in an open state.

Subsequently, the microprocessor 10 generates the distinguishing ID of the in-vehicle sensor 1 in accordance with the judged connection states of the terminals T5, T6 (identifier generation means). In the present first embodiment, the two terminals T5, T6 are provided as external terminals for setting, and each terminal is brought into one of two connection states; i.e., the open state and the ground potential connected state. Therefore, $2^2=4$ combinations are realized by changing the connection states of the two terminals T5, T6, and any of four distinguishing IDs can be generated.

The microprocessor 10 includes a nonvolatile memory 11, and stores, as a distinguishing ID (identifier), in the nonvolatile memory 11 an initial identifier IDS first generated on the basis of the connection states of the terminals T5, T6 when the in-vehicle sensor 1 is powered for the first time (storing means).

After that point in time, the microprocessor 10 performs communications through the CAN bus by using the distinguishing ID (the initial identifier IDS) stored in the nonvolatile memory 11. Specifically, the microprocessor 10 communicates with the ECU by transmitting communication data which includes the stored distinguishing ID.

Further, in the in-vehicle sensor 1 of the present first embodiment, the initial identifier IDS generated at the time of first power on is stored in the nonvolatile memory 11 as a distinguishing ID (identifier), and, at the time of second or subsequent power on, a judgment is made as to whether or not a new identifier IDN newly generated is identical with the initial identifier IDS stored in the nonvolatile memory 11. In the case where the new identifier IDN is not identical with the initial identifier IDS, communication data indicating a generation anomaly is transmitted. Specifically, communication data which includes the initial identifier IDS and anomaly notification data indicating the generation anomaly of the new identifier IDN is transmitted.

Next, for the in-vehicle sensor 1 according to the present first embodiment, operation of the microprocessor 10 at the time of first power on will be described with reference to the flowchart of FIG. 3.

When electrical power is supplied to the microprocessor 10 (power on), the microprocessor 10 judges in S0 whether or not the nonvolatile memory 11 is empty so as to judge whether or not the power on is the first power on. In the case where the nonvolatile memory 11 is empty, the microprocessor 10 makes a "Yes" judgment in S0, and proceeds to S1 so as to execute an operation for the first power on (steps S1 to S9) shown in FIG. 3. Meanwhile, in the case where the nonvolatile memory 11 is not empty (some data have been written), the microprocessor 10 makes a "No" judgment in S0, and proceeds to S11 shown in FIG. 4 so as to execute an operation for the second or subsequent power on (steps S11 to S20).

In the case where the microprocessor 10 proceeds to step S1 (the result of the judgment in step S0 is Yes); namely, at the time of the first power on, the microprocessor 10 first reads the input levels of the two input ports 10I1, 10I2 of the microprocessor 10 in step S1.

Next, in step S2, the microprocessor 10 judges whether or not the input level of the input port 10I1 read in step S1 is the high level. In the case where the input level of the input port 10I1 is the high level (the result of the judgment in step S2 is Yes), the microprocessor 10 proceeds to step S3, judges that the terminal T5 communicating with the input port 10I1 is in an open state, and then proceeds to step S5. Meanwhile, in the case where the input level of the input port 10I1 is the low level (the result of the judgment in step S2 is No), the microprocessor 10 proceeds to step S4, judges that the terminal T5 communicating with the input port 10I1 is connected to the ground potential GND (the ground potential connected state), and then proceeds to step S5.

In step S5, the microprocessor 10 judges whether or not the input level of the input port 10I2 read in step S1 is the high level. In the case where the input level of the input port 10I2 is the high level (the result of the judgment in step S5 is Yes), the microprocessor 10 proceeds to step S6, judges that the terminal T6 communicating with the input port 10I2 is in an open state, and then proceeds to step S8. Meanwhile, in the case where the input level of the input port 10I2 is the low level (the result of the judgment in step S5 is No), the microprocessor 10 proceeds to step S7, judges that the terminal T6 communicating with the input port 10I2 is connected to the ground potential GND (the ground potential connected state), and then proceeds to step S8.

In step S8, the microprocessor 10 generates the distinguishing ID (the initial identifier IDS) of the in-vehicle sensor 1 on the basis of the connection states of the two terminals T5, T6 (in the present example, the terminal T5 is in a ground potential connected state, and the terminal T6 is in an open state). In step S9 subsequent thereto, the microprocessor 10 stores the first generated initial identifier IDS in the nonvolatile memory 11 of the microprocessor 10, and ends the distinguishing ID generating and storing operation for the first power on.

After that, the microprocessor 10 performs communications through the CAN bus by using the distinguishing ID (the initial identifier IDS) stored in the nonvolatile memory 11.

Next, for the in-vehicle sensor 1 according to the present first embodiment, operation of the microprocessor 10 at the time of second or subsequent power on will be described with reference to the flowchart of FIG. 4.

Figure 3:
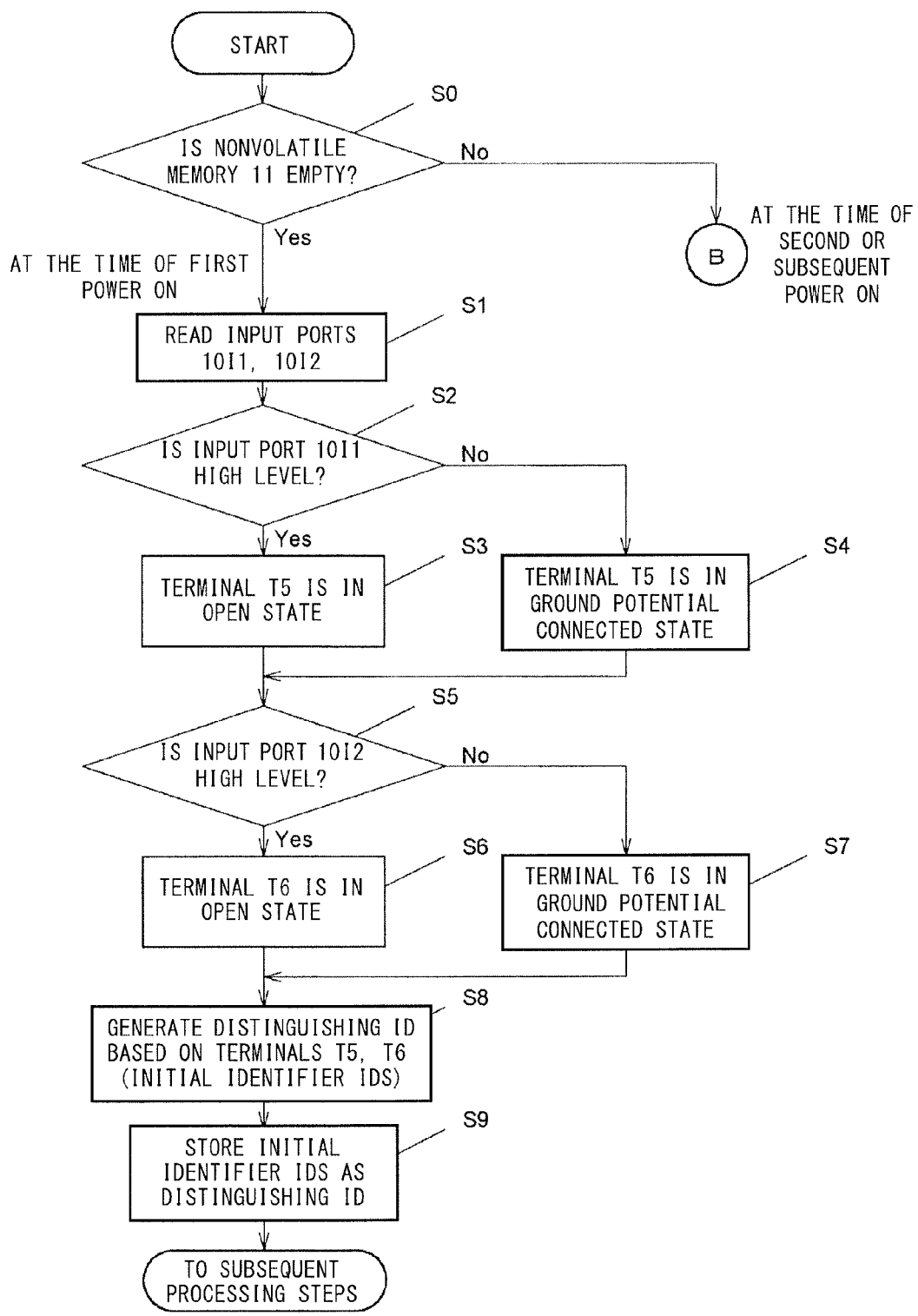
Figure 4:
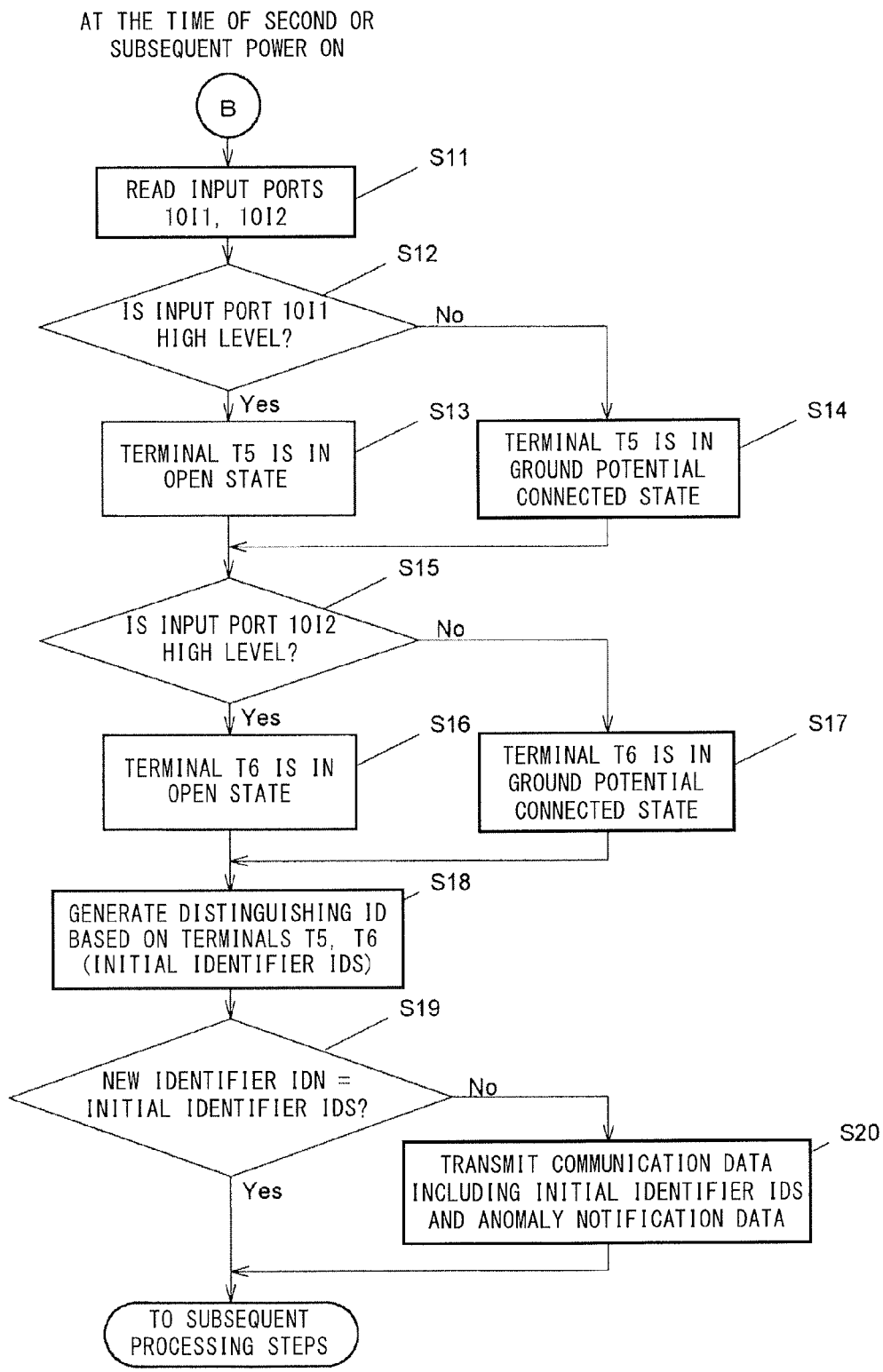

In the case where electrical power is supplied to the microprocessor 10 (power on) and the microprocessor 10 proceeds to step S11 of FIG. 4 (the result of the judgment in S0 is No); i.e., at the time of second or subsequent power on, the microprocessor 10 first reads the input levels of the two input ports 10I1, 10I2 of the microprocessor 10 in step S11. The processing operation of steps step S11 to S17 of FIG. 4 is identical with the processing operation of steps step S1 to S7 of FIG. 3.

Therefore, the microprocessor 10 executes steps S11 to S17 in the same manner as in steps S1 to S7 to thereby judge the connection states of the terminals T5, T6, and proceeds to step S18.

In step S18, the microprocessor 10 newly generates a distinguishing ID (a new identifier IDN) on the basis of the judged connection states of the terminals T5, T6. In step S19 subsequent thereto, the microprocessor 10 judges whether or not the new identifier IDN newly generated is identical with the initial identifier IDS stored in the nonvolatile memory 11. In the case where the new identifier IDN is not identical with the initial identifier IDS (the result of the judgment in S19 is No), the microprocessor 10 proceeds to step S20. In S20, the microprocessor 10, which serves as a CAN controller, transmits to the CAN bus (e.g., toward the ECU) communication data which includes the initial identifier IDS and anomaly notification data indicating generation anomaly of the new identifier IDN. Meanwhile, in the case where the new identifier IDN is identical with the initial identifier IDS (the result of the judgment in S19 is Yes), the microprocessor 10 skips step S20. The microprocessor 10 then ends the distinguishing ID generating and storing operation for the second or subsequent power on. After that, the microprocessor 10 performs communications through the CAN bus by using the distinguishing ID (the initial identifier IDS) stored in the nonvolatile memory 11. However, when a generation anomaly of the new identifier IDN occurs, as described above, in step S20, communication data which includes anomaly notification data as communication data representing the generation anomaly is transmitted to the CAN bus. Specifically, communication data which includes the initial identifier IDS and anomaly notification data indicating the generation anomaly of the new identifier IDN is transmitted. Therefore, it is possible to properly notify other devices, such as the ECU, of the fact that the generation anomaly of the new identifier IDN has occurred; i.e., to allow the other devices to know occurrence of the generation anomaly of the new identifier IDN by judging whether or not the anomaly notification data is contained in the transmitted communication data.

Furthermore, for the in-vehicle sensor 1 of the present first embodiment, operation of the microprocessor 10 at each of predetermined timings after electric power has been supplied thereto will be described with reference to FIG. 5.

The microprocessor 10 executes the processing shown in FIG. 5, by generating timer interruption, at predetermined timings (at intervals of 10 minutes in the present first embodiment) during the subsequent processing (hereinafter referred to as "ordinary operation") which is performed after completion of the operation at the time of the first power on shown in FIG. 3 and after completion of the operation at the time of the second or subsequent power on shown in FIG. 4.

Figure 5:
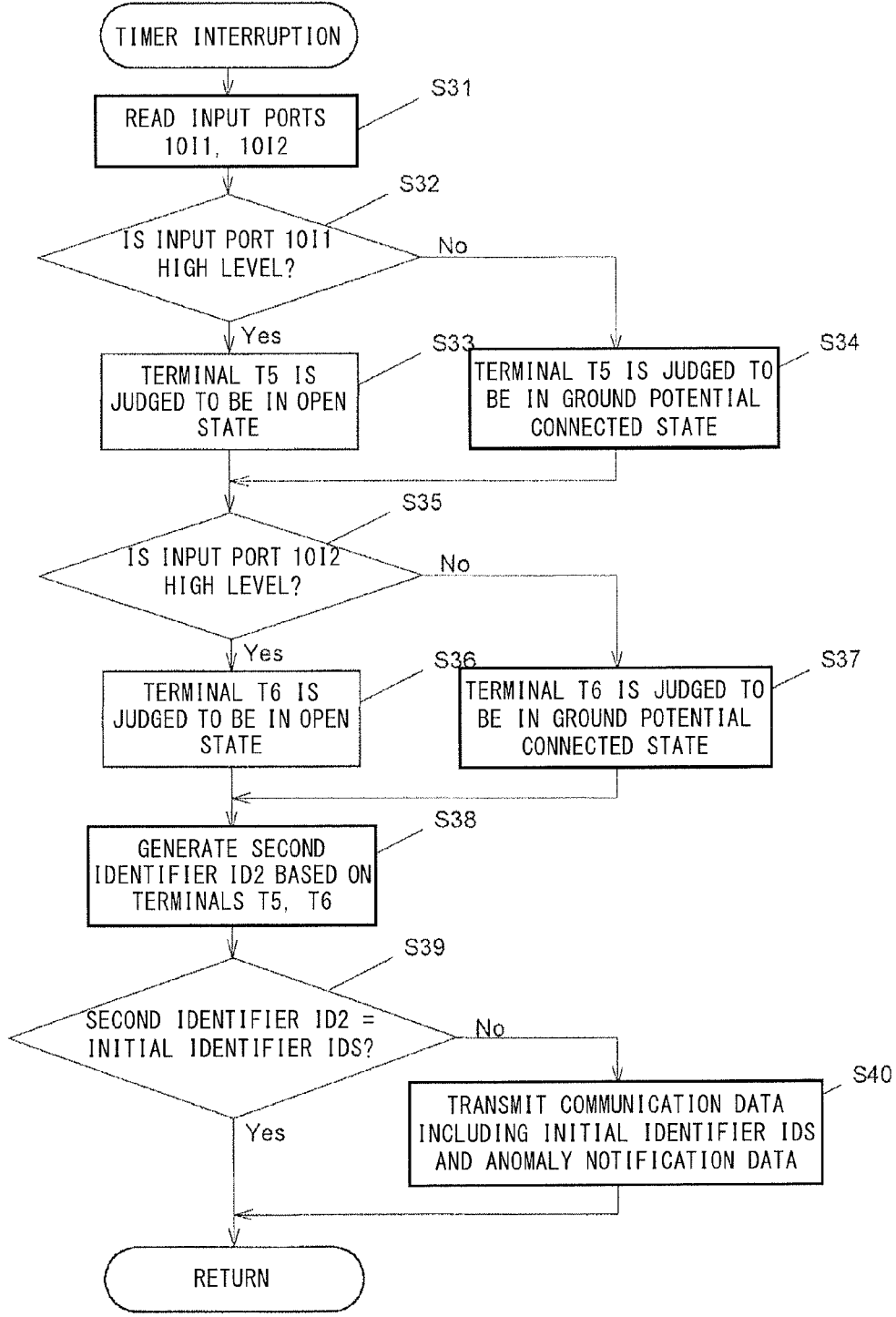
FIG. 5 Flowchart relating to the in-vehicle sensor according to the first embodiment and showing operation of the microprocessor at each of predetermined timings after the microprocessor has been powered.

Notably, the processing operation of steps S31 through S40 at the predetermined timings shown in FIG. 5 is identical with the processing operation of judging the new identifier IDN in steps S11 through S20 at the time of the second or subsequent power on shown in FIG. 4. Further, of the processing operation shown FIG. 5, the processing operation of steps S31 through S37 is identical with the processing operation of steps S11 through S17 shown in FIG. 4, and is also identical with the processing operation of steps S1 through S7 at the time of the first power on shown in FIG. 3.

Specifically, timer interruption to the microprocessor 10 occurs at the predetermined timings (at intervals of 10 minutes) during the ordinary operation after the microprocessor 10 has been powered and the processing at the time of the power on shown in FIG. 3 or FIG. 4 has been completed. In response thereto, the microprocessor 10 first reads the input levels of the input ports 10I1 and 10I2 thereof in step S31. Subsequently, the microprocessor 10 performs steps S31 through S37 in the same manner as in the case of steps S1 through S7 and steps S11 through S17 to thereby judge the connection states of the terminals T5 and T6, and then proceeds to step S38.

In step S38, the microprocessor 10 newly generates a second identifier ID2 at each of the predetermined timings on the basis of the judged states of the terminals T5 and T6. In step S39 subsequent thereto, the microprocessor 10 judges whether or not the newly generated second identifier ID2 is identical with the initial identifier IDS stored in the nonvolatile memory 11. In the case where the second identifier ID2 is not identical with the initial identifier IDS (the result of the judgment in S39 is No), the microprocessor 10 proceeds to step S40. In S40, as in step S20 shown FIG. 4, the microprocessor 10 transmits to the CAN bus (e.g., toward the ECU) communication data which includes the initial identifier IDS and anomaly notification data indicating generation anomaly of the second identifier ID2. Meanwhile, in the case where the second identifier ID2 is identical with the initial identifier IDS (the result of the judgment in S39 is Yes), the microprocessor 10 skips step S40. The microprocessor 10 then ends the processing performed in response to the timer interruption at each of the predetermined timings, and returns to the ordinary operation (return).

In this manner, the in-vehicle sensor 1 of the present first embodiment regularly judges generation anomaly of the second identifier ID2, instead of generation anomaly of the new identifier IDN, during the ordinary operation performed after the power on.

In the present first embodiment, the microprocessor 10 which executes steps S1-S7 and steps S11-S17 corresponds to the judgment means, and the microprocessor 10 which executes steps S31-S37 corresponds to the second judgment means. Also, the microprocessor 10 which executes steps S8 and S18 corresponds to the identifier generation means, and the microprocessor 10 which executes step S38 corresponds to the second identifier generation means. Also, the nonvolatile memory 11 corresponds to the storage section, and the microprocessor 10 which executes step S9 corresponds to the storing means. Also, the microprocessor 10 which executes step S19 corresponds to the identicalness judgment means, and the microprocessor 10 which executes step S39 corresponds to the second identicalness judgment means. Also, the microprocessor 10 which executes step S20 corresponds to the anomaly transmission means and the anomaly notification data transmission means, and the microprocessor 10 which executes step S40 corresponds to the second anomaly transmission means. Also, the microprocessor 10, which serves as a CAN controller, and the CAN transceiver 50 correspond to the communication means.

Next, the in-vehicle sensor system 2 shown in FIG. 2 will be described. In the in-vehicle sensor system 2, four in-vehicle sensors 1 according to the present first embodiment which have the same specifications are connected to the CAN bus through use of the four connection paths 100, 200, 300, 400. As described above, the four connection paths 100, 200, 300, 400 are the same in terms of the connector specifications of the sensor connection connector 110-410, and the power supply line 120 and the communication connection path 130 are the same among all the connection paths 100-400. However, the connection paths 100-400 differ from one another in terms of the combination of the connection states of the setting path 140, 240, 340, 440 which determines the connection states of the terminals T5, T6 of each in-vehicle sensor 1. Thus, in this in-vehicle sensor system 2, four distinguishing IDs (initial identifiers IDS) are set by rending the connection states of the terminals T5, T6 of each in-vehicle sensor 1 different from those of other in-vehicle sensors 1.

As having been described, in the in-vehicle sensor 1 of the present first embodiment, the terminals T5, T6 (external terminals for setting) for setting a distinguishing ID (identifier) are provided in the bus connection connector 40, and each of the terminals T5, T6 is brought into one of two connection states; i.e., the open state (the first connection state) in which it is not connected to any potential outside the in-vehicle sensor 1 and the ground potential connected state (the second connection state (the potential connected state)) in which it is connected to the ground potential GND (the predetermined potential) outside the in-vehicle sensor 1.

When electric power is supplied for the first time in a state in which the bus connection connector 40 is connected to the CAN bus (communication bus), the in-vehicle sensor 1 judges the connection states of the terminals T5, T6 on the basis of the input levels of the input ports 10I1, 10I2 of the microprocessor 10 (the judgment means: steps S1 to S7); generates the distinguishing ID (the first generated initial identifier IDS) of the in-vehicle sensor 1 on the basis of the connection states (the identifier generation means: step S8); and stores the initial identifier IDS in the nonvolatile memory 11 (the storing means: step S9). After that, the in-vehicle sensor 1 performs communications through the CAN bus by using the initial identifier IDS stored in the nonvolatile memory 11.

Therefore, even in the case where a plurality of in-vehicle sensors 1 of the same type are used in the vehicle VE, it is unnecessary to assign a distinguishing ID to each of the in-vehicle sensors 1 in advance. Also, when each in-vehicle sensor 1 is installed in the vehicle VE, the terminals T5, T6 of the bus connection connector 40 are brought into connection states peculiar to the installed location, whereby the distinguishing ID (the initial identifier IDS) of the in-vehicle sensor 1 can be made different from those of the remaining in-vehicle sensors 1.

Further, the in-vehicle sensor 1 of the present first embodiment includes the identicalness judgment means (step S19) and the anomaly transmission means (step S20). In the case where the new identifier IDN newly generated by the identifier generation means (step S18) is not identical with the initial identifier IDS stored in the nonvolatile memory 11 (the result of the judgment in step S19 is No), the microprocessor 10 (the communication means), which is served as a CAN controller, is caused to transmit communication data which indicates the generation anomaly of the new identifier IDN. Therefore, it is possible to notify other devices such as the ECU of the fact that the generation anomaly of the new identifier IDN has occurred because the microprocessor 10 was affected by temporary noise when it judged the connection states of the terminals T5, T6, the connection of the terminals T5, T6 was broken, or the in-vehicle sensor 1 was removed temporarily for maintenance or the like and was then connected to a connector at a location different from the location of the connector to which the in-vehicle sensor 1 had been connected before the removal.

Moreover, in the in-vehicle sensor 1 of the present first embodiment, in the case where the new identifier IDN is not identical with the initial identifier IDS (the result of the judgment in step S19 is No), communication data including the initial identifier IDS and anomaly notification data is transmitted. Therefore, it is possible to notify other devices, such as the ECU, of the in-vehicle sensor 1 in which the generation anomaly of the new identifier IDN has occurred.

Also, the in-vehicle sensor system 2 in which a plurality of (four) in-vehicle sensors 1 according to the present first embodiment are connected has the connection paths 100, 200, 300, 400 including the sensor connection connectors 110 mated with the bus connection connectors 40 of the corresponding in-vehicle sensors 1. The setting paths 140, 240, 340, 440 of the connection paths 100, etc. each of which sets the connection state of each of the terminals T5, T6 of the corresponding bus connection connector 40 differ from one another in terms of the combination of the connection states of the terminals T5, T6 set by the setting paths. By virtue of this, it is possible to set different distinguishing IDs for the four in-vehicle sensors 1 by merely connecting the bus connection connectors 40 of the four in-vehicle sensors 1 to the sensor connection connectors 110-410 of the connection paths 100-400. As described above, there can be obtained the in-vehicle sensor system 2 which eliminates the necessity of assigning distinguishing IDs in advance, and which can use a plurality of in-vehicle sensors 1 of the same type having the same specifications by setting the distinguishing IDs (the initial identifiers IDS) of the in-vehicle sensors 1 such that they differ from one another.

(Second Embodiment)

Next, a second embodiment of the present invention will be described with reference to FIGS. 1 through 3 and 6. As shown FIGS. 1 and 2, an in-vehicle sensor 1A of the present second embodiment has a configuration identical with that of the in-vehicle sensor 1 of the first embodiment. Of operations (programs) performed by a microprocessor 10A, an operation at the time of the first power on is the same as that in the first embodiment shown in FIG. 3. Namely, in the in-vehicle sensor 1A of the present second embodiment, when electric power is supplied to the microprocessor 10A, the microprocessor 10A operates as follows. At the time of the first power on, the result of the judgment in step S0 shown in FIG. 3 becomes Yes. Therefore, the microprocessor 10A proceeds to step S1 and performs the operation for the first power on (steps S1 to S9) shown in FIG. 3 in the same manner as in the case of the in-vehicle sensor 1 of the first embodiment.

Figure 6:
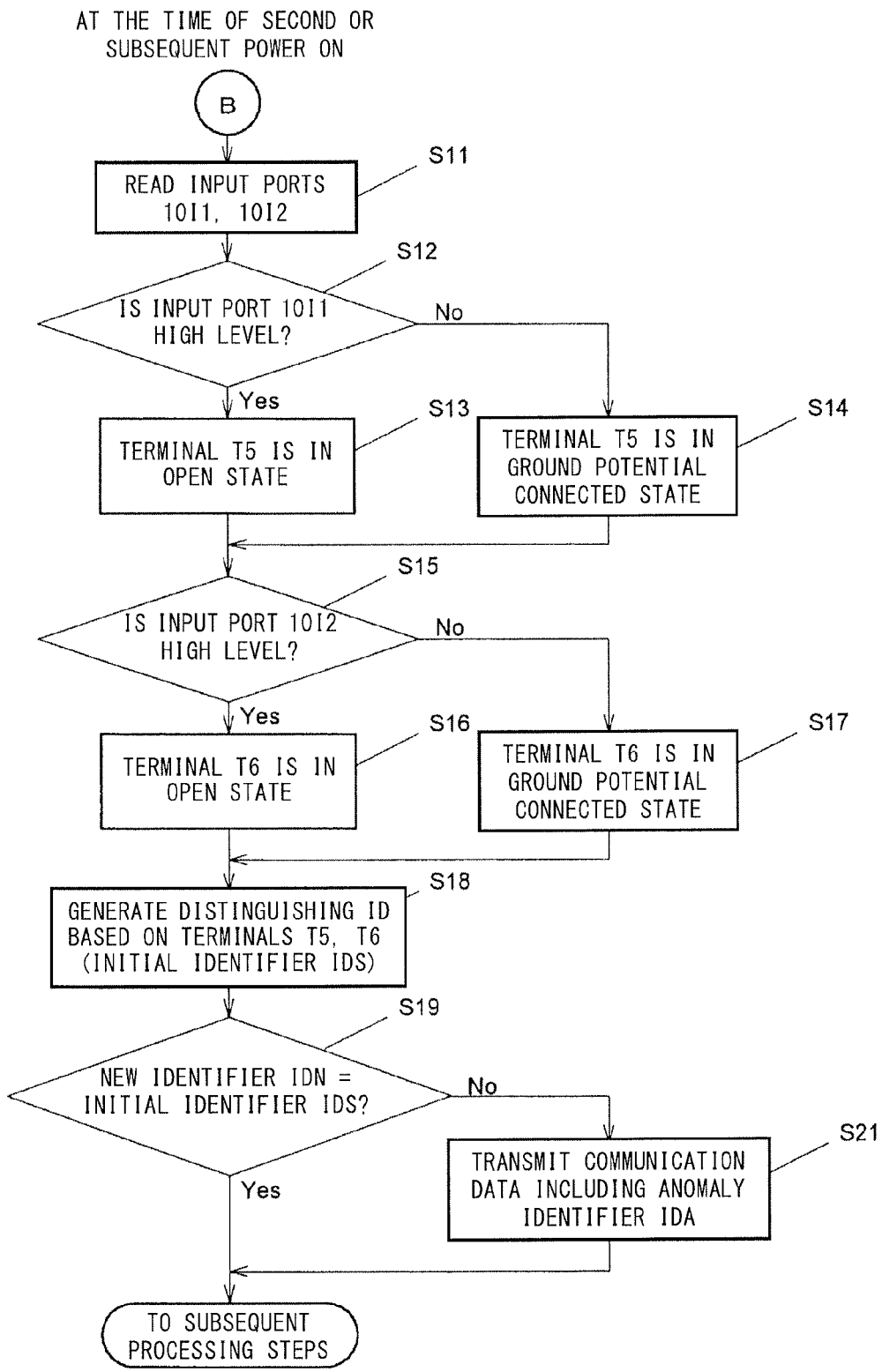

The operation at the time of the second or subsequent power on shown in FIG. 6 is substantially the same as that in the first embodiment shown in FIG. 4. However, the present second embodiment differs from the first embodiment in the operation of the anomaly transmission means for transmitting the communication data which indicates the generation anomaly of the new identifier IDN. Notably, in FIG. 6, steps in which the same processing as that shown in FIG. 4 is performed are denoted by the same step numbers. The present second embodiment differs from the first embodiment only in the point that the processing of step S21 of FIG. 6 is performed in place of the processing of step S20 of FIG. 4.

Therefore, for the in-vehicle sensor 1A according to the present second embodiment. the operation of the microprocessor 10A at the time of the second or subsequent power on will be described with reference to the flowchart of FIG. 6 in such a manner that a portion different from the first embodiment is mainly described and the description of the same portion as the first embodiment is omitted.

When the microprocessor 10A proceeds to step S11 of FIG. 6 at the time of the second or subsequent power on, as in the case of the first embodiment of FIG. 4, the microprocessor 10A executes the processing of step S11 to S17 to thereby judge the connection states of the terminals T5, T6, and then proceeds to step S18.

In step S18, the microprocessor 10A newly generates a distinguishing ID (a new identifier IDN) on the basis of the judged connection states of the terminals T5, T6. In step S19, the microprocessor 10A judges whether or not the new identifier IDN newly generated is identical with the initial identifier IDS stored in the nonvolatile memory 11. In the case where the new identifier IDN is not identical with the initial identifier IDS (the result of the judgment in S19 is No), the microprocessor 10A proceeds to step S21. In S21, the microprocessor 10A, which serves as a CAN controller, transmits to the CAN bus communication data which includes a predetermined anomaly identifier IDA, as communication data indicating the generation anomaly. Meanwhile, in the case where the new identifier IDN is identical with the initial identifier IDS (the result of the judgment in S19 is Yes), the microprocessor 10A skips step S21. The microprocessor 10A then ends the series of operations for the second or subsequent power on, and proceeds to the subsequent processing steps.

As a result, the microprocessor 10A performs communications through the CAN bus by transmitting communication data including the initial identifier IDS when the new identifier IDN is normal, or by transmitting communication data including the anomaly identifier IDA when the new identifier IDN is anomalous. Therefore, it is possible to properly notify other devices, such as the ECU, of the fact that the generation anomaly of the new identifier IDN has occurred; i.e., to allow the other devices to know occurrence of the generation anomaly of the new identifier IDN by judging whether or not the distinguishing ID of the transmitted communication data is the anomaly identifier IDA.

Notably, in the first embodiment, as shown in FIG. 5, timer interruption is generated at the predetermined timings (at intervals of 10 minutes) during the ordinary operation after the power on so as to execute the processing of steps S31 through S40. Thus, generation anomaly of the second identifier ID2 is judged regularly during the ordinary operation after the power on as well, in the same manner as that used for judging the new identifier IDN. Also, the processing operation of steps S31 through S40 is rendered the same as that of steps S11 through S20 performed at the time of the second or subsequent power on shown in FIG. 4.

Although a flowchart is not shown, the present second embodiment may be modified in the same manner as in the first embodiment. Specifically, the present second embodiment may be modified in such a manner as to generate timer interruption at the predetermined timings (for example, at intervals of 10 minutes) during the ordinary operation after the power on so as to perform processing similar to the processing of steps Sll through S19 and S21 performed at the time of the second or subsequent power on shown in FIG. 6. Thus, instead of generation anomaly of the new identifier IDN, generation anomaly of the second identifier ID2 can be judged regularly during the ordinary operation after power on.

In the present second embodiment, the microprocessor 10A which executes steps S1-S7 and steps S11-S17 corresponds to the judgment means. Also, the microprocessor 10A which executes steps S8 and S18 corresponds to the identifier generation means. Also, the nonvolatile memory 11 corresponds to the storage section, and the microprocessor 10A which executes step S9 corresponds to the storing means. Also, the microprocessor 10A which executes step S19 corresponds to the identicalness judgment means, and the microprocessor 10A which executes step S21 corresponds to the anomaly transmission means and the identifier substitution means. Also, the microprocessor 10A, which serves as a CAN controller, and the CAN transceiver 50 correspond to the communication means. Namely, in the present second embodiment, only the anomaly transmission means and the identifier substitution means of step S21 differ from those of the first embodiment.

Notably, as in the case of the first embodiment, the in-vehicle sensor 1A of the present second embodiment may be used for the in-vehicle sensor system 2. In this case, four in-vehicle sensors 1A of the same type are connected to the CAN bus by using the connection paths 100, 200, 300, and 400, whereby the connection states of the two terminals T5, T6 of each in-vehicle sensors 1A are made different from those of the remaining in-vehicle sensors 1A, and thus, four different distinguishing IDs (initial identifiers IDS) can be set for the in-vehicle sensors 1A (see FIG. 2).

As described above, in the in-vehicle sensor 1A of the present second embodiment, in the case where the new identifier IDN is not identical with the initial identifier IDS (the result of the judgment in step S19 is No), communication data including the predetermined anomaly identifier IDA is transmitted. Therefore, it is possible to notify other devices, such as the ECU, of the presence of an in-vehicle sensor 1A in which the generation anomaly of the new identifier IDN has occurred.

Also, since the remaining portion of the in-vehicle sensor 1A of the present second embodiment is the same as that of the in-vehicle sensor 1 of the first embodiment, the in-vehicle sensor 1A of the present second embodiment achieves the same action and effect as those of the in-vehicle sensor 1 of the first embodiment.

(Modified Embodiment)

Next, a modified embodiment of the above-described first and second embodiments will be described with reference to FIG. 7. In the case of the first and second embodiments, when electric power is supplied to the microprocessor 10, 10A (power on), in order to judge whether or not the power on is the first power on, the microprocessor 10, 10A judges in step S0 of FIG. 3 whether or not the nonvolatile memory 11 is empty. In the case where the nonvolatile memory 11 is empty (the result of the judgment in step S0 is Yes), the microprocessor 10, 10A proceeds to step S1 and executes the operation for the first power on. In the case where the nonvolatile memory 11 is not empty (some data have been written into the nonvolatile memory 11) (the result of the judgment in step S0 is No), the microprocessor 10, 10A proceeds to step S11 of FIG. 4 (first embodiment) or to step S11 of FIG. 6 (second embodiment) and executes the operation for the second or subsequent power on.

Figure 7:
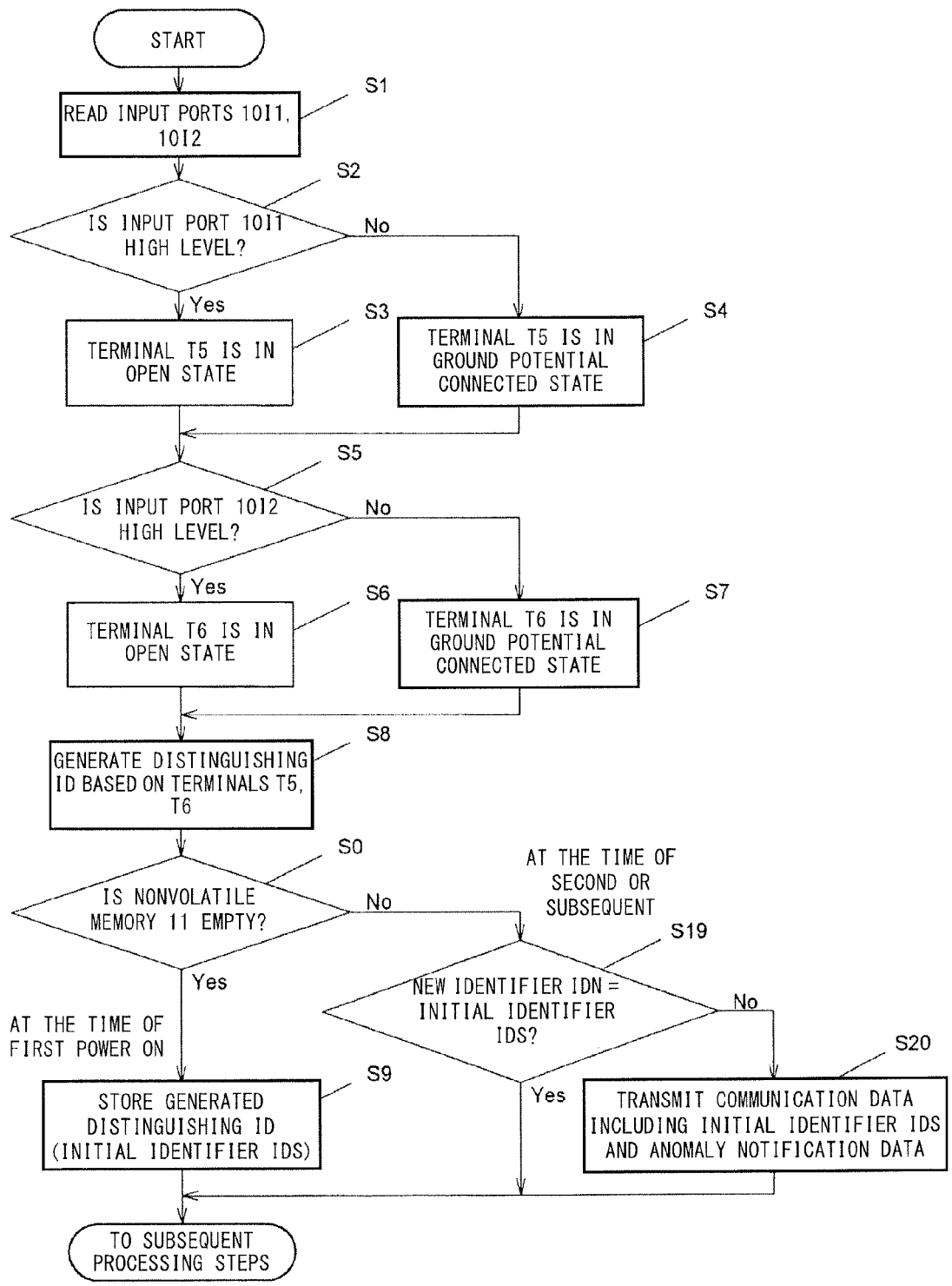

Although the present modified embodiment whose flowchart is shown in FIG. 7 provides the same execution result as that of the first embodiment shown in FIGS. 3 and 4, the present modified embodiment differs from the first embodiment in the execution order of the steps. In the present modified embodiment, when electric power is supplied to the microprocessor 10, the microprocessor 10 executes the same steps S1 to S7 irrespective of whether the power on is the first power on or the second or subsequent power on.

Subsequently, the microprocessor 10 judges the connection states of the terminals T5, T6, and then proceeds to step S8. Notably, in FIG. 7, steps in which the same processing as that shown in FIGS. 3 and 4 is performed are denoted by the same step numbers.

In step S8, the microprocessor 10 generates a distinguishing ID on the basis of the judged connection states of the terminals T5, T6, and then proceeds to step S0, which is performed immediately after power on in the first embodiment, so as to judge whether or not the power on is the first power on by judging whether or not the nonvolatile memory 11 is empty.

In the case where the power on is the first power on and the nonvolatile memory 11 is empty (the result of the judgment in step S0 is Yes), the microprocessor 10 proceeds to step S9.

Since the distinguishing ID generated in step S8 is the first generated initial identifier IDS, in step S9, the microprocessor 10 stores this initial identifier IDS in the nonvolatile memory 11 as a distinguishing ID. Subsequently, the microprocessor 10 ends the distinguishing ID generating and storing operation for the first power on, and proceeds to the subsequent processing steps.

Meanwhile, in the case where the power on is the second or subsequent power on and the nonvolatile memory 11 is not empty (the result of the judgment in step S0 is No), the microprocessor 10 proceeds to step S19.

Since the distinguishing ID generated in step S8 is a newly generated new identifier IDN, in step S19, the microprocessor 10 judges whether or not the new identifier IDN is identical with the initial identifier IDS stored in the nonvolatile memory 11. In the case where the new identifier IDN is not identical with the initial identifier IDS (the result of the judgment in S19 is No), the microprocessor 10 proceeds to step S20. In S20, as in the case of the first embodiment, the microprocessor 10 (communication means), which serves as a CAN controller, transmits to the CAN bus communication data which includes the initial identifier IDS and anomaly notification data indicating generation anomaly of the new identifier IDN. Meanwhile, in the case where the new identifier IDN is identical with the initial identifier IDS (the result of the judgment in S19 is Yes), the microprocessor 10 skips step S20. The microprocessor 10 then ends the series of operations for the second or subsequent power on, and proceeds to the subsequent processing steps.

As described above, the present modified embodiment differs from the first embodiment in the execution order of the steps. However, since the execution result is the same as that of the first embodiment, the present modified embodiment achieves the same action and effect as those of the first embodiment.

In the present modified embodiment, the microprocessor 10 which executes steps S1-S7 corresponds to the judgment means. Also, the microprocessor 10 which executes step S8 corresponds to the identifier generation means. Also, the nonvolatile memory 11 corresponds to the storage section, and the microprocessor 10 which executes step S9 corresponds to the storing means. Also, the microprocessor 10 which executes step S19 corresponds to the identicalness judgment means, and the microprocessor 10 which executes step S20 corresponds to the anomaly transmission means and the anomaly notification data transmission means.

Notably, the present modified embodiment may be applied to the second embodiment by replacing the step S20 of the present modified embodiment with the step S21 of the second embodiment. In this case as well, since the execution result is the same as that of the second embodiment, the present modified embodiment achieves the same action and effect as those of the second embodiment.

Notably, the above-described first and second embodiments and modified embodiment also show an embodiment of the present invention regarding an identifier setting method of setting distinguishing IDs (identifiers) for a plurality of in-vehicle sensors 1, 1A in the in-vehicle sensor system 2.

In the first and second embodiments and modified embodiment, the microprocessors 10, 10A which execute steps S1-S7 and S11-S17 correspond to the judgment step of the identifier setting method of the present invention. Also, the microprocessors 10, 10A which execute steps S8 and S18 correspond to the identifier generation step of the method. Also, the microprocessors 10, 10A which execute step S9 correspond to the storing step of the method. Also, the microprocessors 10, 10A which execute step S19 correspond to the identicalness judgment step of the method. The microprocessor 10 which executes step S20 and the microprocessor 10A which executes step S21 correspond to the anomaly transmission step of the method. Namely, the microprocessors 10, 10A which executes the steps corresponding to the above-described various means also correspond to the steps of the identifier setting method.

In this identifier setting method, when power is supplied to the in-vehicle sensor in a state in which the bus connection connector 40 is connected to the CAN bus (communication bus), the connection states of the terminals T5, T6 are judged by the judgment step (steps S1 to S7), and the distinguishing ID (the initial identifier IDS) of the in-vehicle sensor is generated on the basis of the connection states by the identifier generation step (step S8). Subsequently, by the storing step (step S9), the generated initial identifier IDS is stored in the nonvolatile memory 11 as a distinguishing ID.

As a result, different distinguishing IDs (initial identifiers IDS) can be set for all the in-vehicle sensors.

Also, in this identifier setting method, by the identicalness judgment step (step S19), a judgment is made as to whether the new identifier IDN newly generated in the identifier generation step (step S18) is identical with the initial identifier IDS stored in the nonvolatile memory 11. In the case where the new identifier IDN is not identical with the initial identifier IDS, communication data which indicates the generation anomaly of the new identifier IDN is transmitted by the anomaly transmission step (step S20 and step S21). As a result, it is possible to notify other devices, such as the ECU, of occurrence of the generation anomaly of the new identifier IDN.

(Third Embodiment)

Next, a third embodiment of the present invention will be described with reference to FIGS. 1, 2, and 8. As shown FIGS. 1 and 2, an in-vehicle sensor 1B of the present third embodiment has a configuration identical with that of the in-vehicle sensors 1, 1A of the first and second embodiments. Of operations (programs) performed by a microprocessor 10B, an operation at the time of the first power on is the same as those in the first and second embodiments shown in steps S1 to S9 of FIG. 3. Therefore, the operation at the time of the first power on will not be described in detail here.

In the first and second embodiments, at the time of the first power on, each of the in-vehicle sensors 1, 1A stores in the nonvolatile memory 11 the initial identifier IDS first generated on the basis of the judged connection states of the terminals T5, T6. Subsequently, each of the in-vehicle sensors 1, 1A performs communications through the CAN bus by using the initial identifier IDS stored in the nonvolatile memory 11. The in-vehicle sensor 1B of the present third embodiment performs the same thing.

Also, in the first and second embodiments, at the time of the second or subsequent power on, a judgment is made as to whether or not the newly generated new identifier IDN is identical with the initial identifier IDS. In the case where the new identifier IDN is not identical with the initial identifier IDS, the anomaly transmission means (step S20 and step S21) causes the microprocessor 10, 10A (communication means), which serves as a CAN controller, to transmit communication data indicating the generation anomaly of the new identifier IDN to the CAN bus (see FIGS. 4 and 6). Notably, in the first and second embodiments, at the time of the second or subsequent power on, the distinguishing ID stored in the nonvolatile memory 11 is not updated, and is still the initial identifier IDS stored at the time of the first power on.

The in-vehicle sensor 1B of the present third embodiment is the same as the in-vehicle sensors 1, 1A of the first and second embodiments in the point that, at the time of the second or subsequent power on, a judgment is made as to whether or not the newly generated new identifier IDN is identical with the initial identifier IDS, and, when the new identifier IDN is not identical with the initial identifier IDS, the microprocessor 10B (communication means), which serves as a CAN controller, is caused to transmit communication data indicating the generation anomaly of the new identifier IDN to the CAN bus. Meanwhile, the in-vehicle sensor 1B of the present third embodiment differs from the in-vehicle sensors 1, 1A of the first and second embodiments in the point that, when the new identifier IDN is identical with the initial identifier IDS, the new identifier IDN is stored in the nonvolatile memory 11 as a new distinguishing ID.

Figure 8:
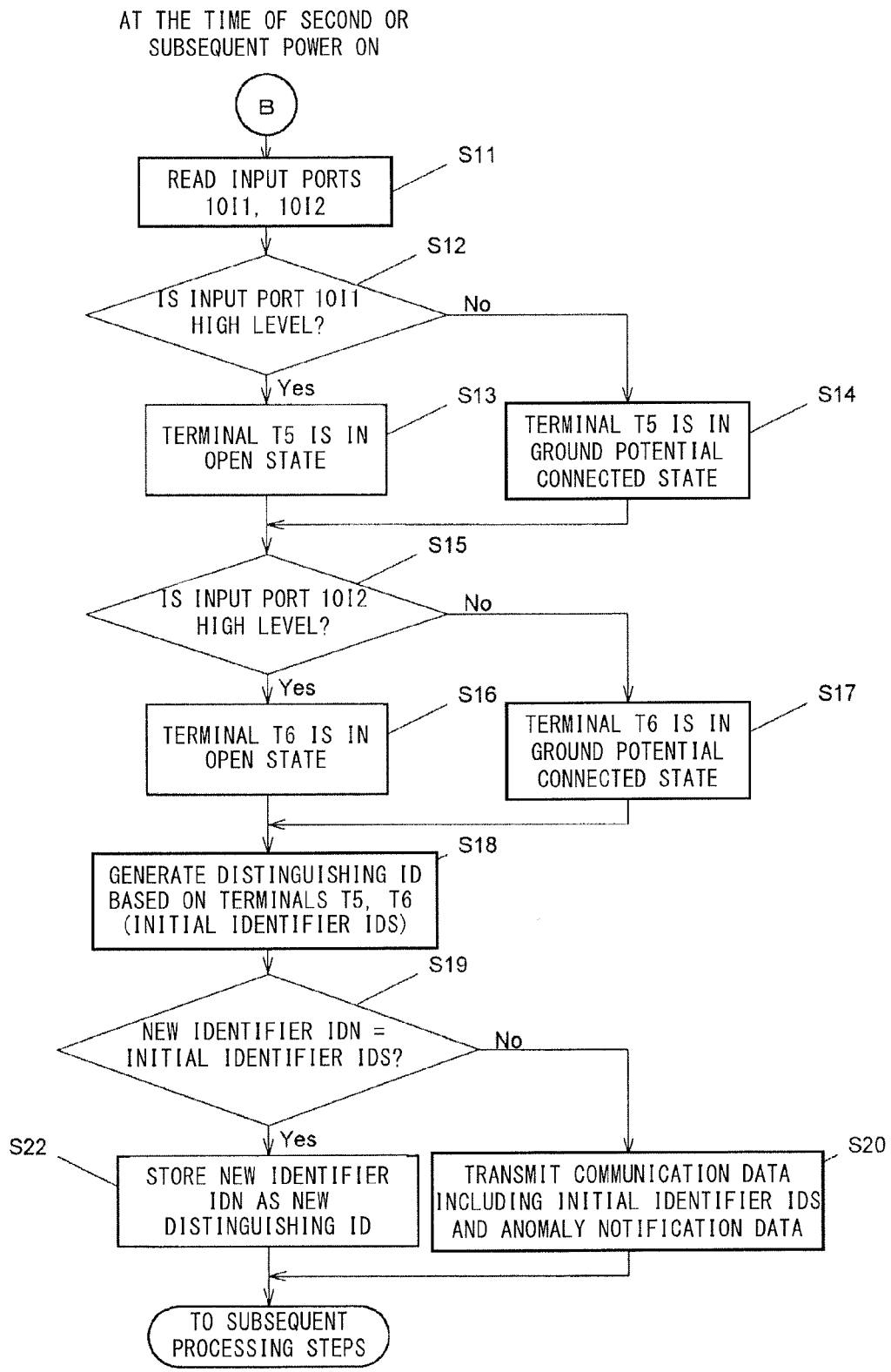

For the in-vehicle sensor 1B of the present third embodiment, operation of the microprocessor 10B at the time of the second or subsequent power on is shown by the flowchart of FIG. 8. Notably, in FIG. 8, steps in which the same processing as that of the first embodiment shown in FIG. 4 is performed are denoted by the same step numbers. The present third embodiment differs from the first embodiment only in the point that the flowchart of FIG. 8 includes a newly added step S22. Below, the operation of the microprocessor 10B shown in FIG. 8 will be described with a focus on a portion different from the first embodiment.

In the case where the microprocessor 10B proceeds to step S11 of FIG. 8 at time of the second or subsequent power on, as in the case of the first embodiment of FIG. 4, the microprocessor 10B performs step S11 to S17 to thereby judge the connection states of the terminals T5, T6, and then proceeds to step S18.

In step S18, the microprocessor 10B newly generates a distinguishing ID (a new identifier IDN) on the basis of the judged connection sates of the terminals T5, T6. Notably, although the description of the operation at the time of the first power on is omitted, the initial identifier IDS is stored in the nonvolatile memory 11 by the same procedure as that in the first embodiment of FIG. 3 (see step S9 of FIG. 3).

Next, in step S19, the microprocessor 10B judges whether or not the new identifier IDN newly generated is identical with the initial identifier IDS stored in the nonvolatile memory 11. In the case where the new identifier IDN is identical with the initial identifier IDS (the result of the judgment in S19 is Yes), the microprocessor 10B proceeds to step S22 so as to store the new identifier IDN in the nonvolatile memory 11. Meanwhile, in the case where the new identifier IDN is not identical with the initial identifier IDS (the result of the judgment in S19 is No), the microprocessor 10B proceeds to step S20 without storing the new identifier IDN. In S20, as in the case of first embodiment of FIG. 4, the microprocessor 10B (communication means), which serves as a CAN controller, transmits to the CAN bus communication data which includes anomaly notification data indicating a generation anomaly of the new identifier IDN. Subsequently, the microprocessor 10B ends the series of operations for the second or subsequent power on, and proceeds to the subsequent processing steps.

After that, the microprocessor 10B performs communications through the CAN bus by using the distinguishing ID (initial identifier IDS) stored in the nonvolatile memory 11. In the case where a generation anomaly of the new identifier IDN has occurred, as in the case of the first embodiment, the microprocessor 10B transmits to the CAN bus communication data which contains the initial identifier IDS and anomaly notification data indicating the generation anomaly of the new identifier IDN. Therefore, it is possible to properly notify other devices, such as the ECU, of the fact that the generation anomaly of the new identifier IDN has occurred; i.e., to allow the other devices to know occurrence of the generation anomaly of the new identifier IDN by judging whether or not the transmitted communication data contains the anomaly notification data.

Notably, in the present third embodiment, unlike the first embodiment, even at the time of the second or subsequent power on, the microprocessor 10B stores the new identifier IDN in the nonvolatile memory 11 as a new distinguishing ID in step S22. Since this step S22 is executed when the new identifier IDN is identical with the initial identifier IDS, substantially, the first generated initial identifier IDS is maintained.

Although a flowchart is not shown, the present third embodiment may be modified in the same manner as in the first embodiment. Specifically, the present third embodiment may be modified in such a manner as to judge generation anomaly of the second identifier ID2 at the predetermined timings (for example, at intervals of 10 minutes) during the ordinary operation after the power on.

In the present third embodiment, the microprocessor 10B which performs step S9 corresponds to the storing means. The correspondences of the remaining portions to the elements of claims are the same as those of the microprocessor 10 of the in-vehicle sensor 1 according to the first embodiment.

Also, as in the case of the first and second embodiments, the in-vehicle sensor 1B of the present third embodiment may be used for the in-vehicle sensor system 2. In this case, four in-vehicle sensors 1B of the same type are connected to the CAN bus by using the connection paths 100, 200, 300, and 400, whereby the connection states of the two terminals T5, T6 of each in-vehicle sensors 1B are made different from those of the remaining in-vehicle sensors 1B, and thus, four different distinguishing IDs (initial identifiers IDS) can be set for the in-vehicle sensors 1B (see FIG. 2).

Also, as in the case of the first and second embodiments, the present third embodiment also shows an embodiment of the present invention regarding an identifier setting method of setting identifiers for a plurality of in-vehicle sensors 1B in the in-vehicle sensor system 2. The microprocessor 10B which executes not only the steps (S9, S22) corresponding to the above-described storing means but also the steps corresponding to the remaining means corresponds to the respective steps of the identifier setting method.

In the present third embodiment, as described above, the anomaly transmission means is realized by step S20 (anomaly notification data transmission means) which is the same as that of the first embodiment of FIG. 4. Instead, the anomaly transmission means may be realized by step S21 (identifier substitution means) of the second embodiment of FIG. 6. In this case, in the case where the new identifier IDN is not identical with the initial identifier IDS, the anomaly transmission means transmits communication data which includes a predetermined anomaly identifier IDA.

Also, the execution order of the steps may be changed by applying the modified embodiment of FIG. 7 to the present third embodiment. In this case, when the result of the judgment in step S19 of FIG. 7 becomes Yes, the processing of step S22 of the present third embodiment is performed, whereby the new identifier IDN is stored in the nonvolatile memory 11 as a new distinguishing ID.

As described above, in the in-vehicle sensor 1B of the present third embodiment, in the case where the new identifier IDN newly generated upon supply of electric power is not identical with the initial identifier IDS stored in the nonvolatile memory 11, the microprocessor 10B (communication means), which serves as a CAN controller, is caused to transmit communication data indicating the generation anomaly of the new identifier IDN. Also, in the case where the new identifier IDN is identical with the initial identifier IDS, in step S22 (storing means), the new identifier IDN is stored as a new distinguishing ID. Therefore, when an anomaly occurs at the time of generation of the new identifier IDN, the occurrence of the anomaly can be properly reported to other devices such as the ECU. Also, at that time, the distinguishing ID is not updated, and the first generated initial identifier IDS is maintained.

Therefore, the present third embodiment achieves the same action and effect as those of the first and second embodiments.

In the above, the present invention has been described on the basis of the first through third embodiments and the modified embodiment. However, needless to say, the present invention is not limited to the above-described embodiments and modified embodiment, and may be freely changed for application without departing from the gist of the invention.

For examples, in the embodiments and the modified embodiment, the two terminals T5, T6 are provided as external terminals for setting. Each of the terminals T5, T6 is brought into one of two connection states; i.e., the open state (the first connection state) in which it is not connected to any potential outside the in-vehicle sensor and the ground potential connected state (the second connection state (the potential connected state)) in which it is connected to the ground potential GND (the predetermined potential) outside the in-vehicle sensor. This makes it possible to set $2^2=4$ distinguishing IDs (initial identifiers IDS).

However, the number of external terminals for setting and the combinations of their connection states are not limited to those employed in the above-described embodiments and modified embodiment. The selection of the connection states of the external terminals for setting may be performed as follows. (1) One connection state is selected from the two connection states; i.e., an open state in which an external terminal is not connected to any potential and one potential connected state in which the external terminal is connected to a predetermined potential such as the ground potential GND. This is preferable. Notably, in the above-described embodiments and modified embodiment, the predetermined potential is the ground potential GND. However, the predetermined potential may be the power supply potential VB or an intermediate potential such as the middle potential between the ground potential GND and the power supply potential VB. (2) One connection state is selected from three or more connection states which includes the open state and a plurality of potential connected states in which the external terminal is selectively connected to predetermined potentials different from one another. (3) One connection state is selected from two or more connection states in which the external terminal is selectively connected to predetermined potentials different from one another.

Also, the number of the external terminals for setting can be changed freely in accordance with the number of the in-vehicle sensors connected to the communication bus.

Also, in the embodiments and the modified embodiment, the in-vehicle sensors are sensors connected to the CAN bus. However, the present invention may be applied to in-vehicle sensors connected to a communication bus, other than the CAN bus, for example, to a LIN bus.

Also, the circuit configuration which is used in the embodiments and the modified embodiment so as to connect the terminals T5, T6 to the input ports of the microprocessor is an example, and it is preferred to properly change the circuit configuration in consideration of the combinations of the connection states of the external terminals for setting.

For example, although not illustrated, in the case where a connection state in which an external terminal for setting is connected to an intermediate potential between the ground potential GND and the power supply potential VB, instead of the ground potential GND, is used as the potential connection state in which the external terminal for setting is connected to the predetermined potential, it is preferred that, instead of the circuit of the embodiment and the modified embodiment which uses a microprocessor having digital input signal ports (I/O input ports), a circuit which uses a microprocessor having analog input signal ports (A/D input ports) be employed.

In the first embodiment, the diagnosis using the second identifier ID2 at the predetermined timings (at intervals of 10 minutes) after the power on (shown in FIG. 5) is also performed in addition to the diagnosis of the new identifier IDN at the time of second or subsequent power on (shown in FIG. 4). However, the diagnosis using the second identifier ID2 at the predetermined timings (at intervals of 10 minutes) after the power on may be performed solely without performing the diagnosis at the time of the second or subsequent power on.

Also, the predetermined timings in this case may be regular timings (e.g., the diagnosis using the second identifier ID2 is performed at intervals of 10 minutes) as in the case of the first embodiment, or irregular timings (e.g., the diagnosis using the second identifier ID2 is performed each time the vehicle stops ten times).

DESCRIPTION OF SYMBOLS

VE vehicle
1, 1A, 1B in-vehicle sensor
2 in-vehicle sensor system
10, 10A, 10B microprocessor (communication means)
10I1, 10I2 input port
10O1, 10O2 output port
11 nonvolatile memory (storage section)
40 bus connection connector
T1 terminal (power supply terminal)
T2 terminal (ground terminal)
T3 terminal (communication external terminal)
T4 terminal (communication external terminal)
T5 terminal (external terminal for setting)
T6 terminal (external terminal for setting)
50 CAN transceiver (communication means)
CAN CAN bus (communication bus)
CANH, CANL communication line
100, 200, 300, 400 connection path
110, 210, 310, 410 sensor connection connector
130 communication connection path
140, 240, 340, 440 setting path
S1-S7, S11-S17 judgment means, judgment step
S8, S18 identifier generation means, identifier generation step
S9, S22 storing means, storing step
S19 identicalness judgment means, identicalness judgment step
S20 anomaly notification data transmission means (anomaly transmission means, anomaly transmission step)
S21 identifier substitution means (anomaly transmission means, anomaly transmission step)
S31-S37 second judgment means
S38 second identifier generation means
S39 second identicalness judgment means
S40 second anomaly transmission means

The invention claimed is:

1. An in-vehicle sensor which is used as each of a plurality of in-vehicle sensors mounted in a vehicle and connected to a communication bus constructed in the vehicle, comprising:

a bus connection connector used for connection to the communication bus and including one or a plurality of communication external terminals to be connected to a communication line of the communication bus through which communication data flow, and one or a plurality of external terminals for setting, outside the in-vehicle sensor, each external terminal for setting being brought into one of two connection states composed of an open state in which the terminal is not connected to any potential and one potential connected state in which the terminal is connected to a predetermined potential, being brought into one of three or more connection states composed of the open state and a plurality of potential connected states in which the terminal is selectively connected to predetermined potentials different from one another, or being brought into one of two or more potential connected states in which the terminal is selectively connected to predetermined potentials different from one another;

judgment means for judging the connection state(s) of the one or plurality of external terminals for setting when electric power is supplied to the in-vehicle sensor in a state in which the bus connection connector is connected to the communication bus;

identifier generation means for generating an identifier of the in-vehicle sensor on the basis of the connection state(s) of the one or plurality of external terminals for setting judged by the judgment means;

a nonvolatile storage section for storing the identifier;

communication means for performing communications through the communication bus by using the identifier stored in the storage section; and storing means for storing an initial identifier first generated by the identifier generation means in the storage section as the identifier.

2. An in-vehicle sensor as claimed in claim 1, further comprising:

identicalness judgment means for judging whether or not a new identifier newly generated by the identifier generation means is identical with the initial identifier; and anomaly transmission means, operable when the new identifier is not identical with the initial identifier, for causing the communication means to transmit communication data indicating a generation anomaly of the new identifier.

3. An in-vehicle sensor as claimed in claim 2, wherein the anomaly transmission means includes anomaly notification data transmission means for causing the communication means to transmit, as the communication data indicating the generation anomaly, communication data which includes the initial identifier and anomaly notification data indicating the generation anomaly.

4. An in-vehicle sensor as claimed in claim 2, wherein the anomaly transmission means includes identifier substitution means for causing the communication means to transmit, as the communication data indicating the generation anomaly, communication data which includes a predetermined anomaly identifier.

5. An in-vehicle sensor as claimed in claim 1, further comprising:
second judgment means for judging the connection state(s) of the one or plurality of external terminals for setting at each of predetermined timings after the in-vehicle sensor has been powered and the connection state(s) has been judged by the judgment means;
second identifier generation means for generating a second identifier of the in-vehicle sensor at each of the predetermined timings on the basis of the connection state(s) judged by the second judgment means;
second identicalness judgment means for judging whether or not the second identifier generated by the second identifier generation means is identical with the initial identifier; and
second anomaly transmission means, operable when the second identifier is not identical with the initial identifier, for causing the communication means to transmit communication data indicating a generation anomaly of the second identifier.

6. An in-vehicle sensor system comprising a communication bus constructed in the vehicle, and a plurality of in-vehicle sensors as claimed in claim 1 which are mounted in the vehicle and connected to the communication bus,
the in-vehicle sensor system including a plurality of connection paths which connect the in-vehicle sensors to the communication bus and each of which includes a sensor connection connector provided for each of the plurality of in-vehicle sensors and mated with the bus connection connector of the corresponding in-vehicle sensor,
wherein each of the plurality of connection paths includes a connection path for communication for connecting the one or plurality of communication external terminals to the communication line of the communication bus, and one or a plurality of setting paths provided for the one or plurality of external terminals for setting so as to set the connection state(s) thereof,
wherein the one or plurality of setting paths differ among the connection paths in terms of the combination of the connection state(s) of the external terminal(s) for setting set by the setting path(s), whereby all the in-vehicle sensors are made different from one another in terms of the identifier stored in the storage section.

7. An identifier setting method for an in-vehicle sensor system comprising a communication bus constructed in the vehicle, and a plurality of in-vehicle sensors mounted in the vehicle and connected to the communication bus, the method setting identifiers for the plurality of in-vehicle sensors, wherein
each of the in-vehicle sensors includes
a bus connection connector used for connection to the communication bus and including one or a plurality of communication external terminals to be connected to a communication line of the communication bus through which communication data flow, and one or a plurality of external terminals for setting, outside the in-vehicle sensor, each external terminal for setting being brought into one of two connection states composed of an open state in which the terminal is not connected to any potential and one potential connected state in which the terminal is connected to a predetermined potential, being brought into one of three or more connection states composed of the open state and a plurality of potential connected states in which the terminal is selectively connected to predetermined potentials different from one another, or being brought into one of two or more potential connected states in which the terminal is selectively connected to predetermined potentials different from one another,
a nonvolatile storage section for storing the identifier, and communication means for performing communications through the communication bus by using the identifier stored in the storage section;
the in-vehicle sensor system includes a plurality of connection paths which connect the in-vehicle sensors to the communication bus and each of which includes a sensor connection connector provided for each of the plurality of in-vehicle sensors and mated with the bus connection connector of the corresponding in-vehicle sensor, each of the plurality of connection paths including a connection path for communication for connecting the one or plurality of communication external terminals to the communication line of the communication bus, and one or a plurality of setting paths provided for the one or plurality of external terminals for setting so as to set the connection state(s) thereof, wherein the one or plurality of setting paths differ among the connection paths in terms of the combination of the connection state(s) of the external terminal(s) for setting set by the setting path(s); and
the identifier setting method comprises:
a judgment step of judging the connection state(s) of the one or plurality of external terminals for setting when electric power is supplied to the in-vehicle sensor in a state in which the bus connection connector is connected to the communication bus;
an identifier generation step of generating an identifier of the in-vehicle sensor on the basis of the connection state(s) of the one or plurality of external terminals for setting judged by the judgment step; and
a storing step of storing an initial identifier first generated by the identifier generation step in the storage section as the identifier, wherein the judgment step, the identifier generation step, and the storing step are performed for each of the plurality of in-vehicle sensors.

8. An identifier setting method as claimed in claim 7, further comprising:
an identicalness judgment step of judging whether or not a new identifier newly generated by the identifier generation step is identical with the initial identifier; and
an anomaly transmission step of, when the new identifier is not identical with the initial identifier, causing the communication means to transmit communication data indicating a generation anomaly of the new identifier, wherein the identicalness judgment step and the anomaly transmission step are performed for each of the plurality of in-vehicle sensors.

* * * * *